(12) United States Patent
Kodama et al.

(10) Patent No.: US 10,518,591 B2
(45) Date of Patent: Dec. 31, 2019

(54) PNEUMATIC TIRE

(71) Applicant: The Yokohama Rubber Co., LTD., Minato-ku, Tokyo (JP)

(72) Inventors: Yuji Kodama, Hiratsuka (JP); Masataka Koishi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 302 days.

(21) Appl. No.: 14/436,074

(22) PCT Filed: Jun. 21, 2013

(86) PCT No.: PCT/JP2013/067139
§ 371 (c)(1),
(2) Date: Apr. 15, 2015

(87) PCT Pub. No.: WO2014/061311
PCT Pub. Date: Apr. 24, 2014

(65) Prior Publication Data
US 2015/0266347 A1  Sep. 24, 2015

(30) Foreign Application Priority Data
Oct. 16, 2012 (JP) ................ 2012-229035

(51) Int. Cl.
*B60C 13/00* (2006.01)
*B60C 13/02* (2006.01)

(52) U.S. Cl.
CPC ........ *B60C 13/02* (2013.01); *B60C 2013/026* (2013.01)

(58) Field of Classification Search
CPC .................. B60C 13/02; B60C 2013/026
See application file for complete search history.

(56) References Cited

U.S. PATENT DOCUMENTS

D123,530 S  *  11/1940  Ewart ................... D12/605
2,612,928 A  *  10/1952  Buddenhagen ..... B60C 11/0306
152/209.2

(Continued)

FOREIGN PATENT DOCUMENTS

CN  101909908  12/2010
CN  102026830  4/2011

(Continued)

OTHER PUBLICATIONS

Nokian представила новые зимние шины WR A3 И WR D3 | Colesa.Ru— шины и диски Translated Title: "Nokian introduced new winter tires: WR A3 and WR D3 | Colesa.Ru— tires" See Image at p. 3, second figure <http://colesa.ru/news/9181> (Year: 2011).*

(Continued)

*Primary Examiner* — Matthew J Daniels
*Assistant Examiner* — Nicholas R Krasnow
(74) *Attorney, Agent, or Firm* — Thorpe North & Western

(57) ABSTRACT

A pneumatic tire has a plurality of long radially extending ridges disposed at intervals in the tire circumferential direction on at least one side section of the tire, the ridges being non-uniformly disposed around the tire circumferential direction. The ridges are disposed, for example, so that the angles θ between the ridges vary in the tire circumferential direction.

20 Claims, 28 Drawing Sheets

(56) References Cited

U.S. PATENT DOCUMENTS

| | | | | |
|---|---|---|---|---|
| 2,800,098 A * | 7/1957 | Crosby, Jr. | ............... | B60C 11/01 116/34 R |
| 2,808,867 A * | 10/1957 | Buddenhagen | ..... | B60C 11/0306 152/209.2 |
| 2,878,852 A * | 3/1959 | Lippmann | ........... | B60C 11/0318 152/209.2 |
| 3,023,798 A * | 3/1962 | Moore | ................ | B60C 11/0309 152/209.3 |
| 3,245,452 A * | 4/1966 | Scott | ........................ | B60C 1/00 152/209.1 |
| 3,421,566 A * | 1/1969 | Sidles | ..................... | B60C 17/08 152/522 |
| 3,926,238 A * | 12/1975 | Vorih | ................. | B60C 11/0306 152/209.2 |
| 3,961,657 A * | 6/1976 | Chrobak | ................ | B29D 30/00 152/523 |
| 4,155,393 A * | 5/1979 | Grawey | ................. | B60C 13/02 152/153 |
| 4,235,270 A * | 11/1980 | Kahaner | ................... | B60B 9/12 152/326 |
| 4,265,287 A * | 5/1981 | Abe | ........................ | B60C 11/01 152/209.13 |
| 4,327,792 A * | 5/1982 | Landers | ................. | B60C 11/11 152/209.2 |
| 4,662,830 A * | 5/1987 | Pottebaum | ......... | H05K 7/20172 361/695 |
| 4,784,201 A * | 11/1988 | Palinkas | ................... | B60B 9/12 152/12 |
| 4,936,364 A * | 6/1990 | Kajiwara | ............. | B60C 11/0318 152/209.2 |
| 5,240,054 A * | 8/1993 | Kogure | ............... | B60C 11/0318 152/209.2 |
| 5,303,758 A * | 4/1994 | Clementz | .............. | B60C 13/001 152/523 |
| 5,365,987 A * | 11/1994 | Ishii | .................... | B60C 11/0302 152/209.2 |
| 5,421,387 A * | 6/1995 | Emerson | ............. | B60C 11/0306 152/209.9 |
| 5,618,360 A * | 4/1997 | Sakuno | ............... | B60C 11/0318 152/209.21 |
| 5,645,660 A * | 7/1997 | Attinello | ................. | B60C 13/02 152/523 |
| 5,681,145 A * | 10/1997 | Neely | .................... | F04D 29/328 415/119 |
| 5,769,990 A * | 6/1998 | Hoffmeister | .......... | B29C 33/302 156/110.1 |
| 5,807,446 A * | 9/1998 | Ratliff, Jr. | ............... | B60C 13/02 152/523 |
| 5,865,921 A * | 2/1999 | Zakelj | ................. | B60C 11/0318 152/209.2 |
| 5,871,599 A * | 2/1999 | Naoi | ........................ | B60C 3/04 152/454 |
| 5,913,240 A * | 6/1999 | Drahne | ................. | B60T 8/1725 73/146 |
| 6,112,167 A * | 8/2000 | Zakelj | ................. | B60C 11/0318 702/191 |
| 6,651,712 B1 * | 11/2003 | Sundkvist | ........... | B60C 11/0318 152/209.12 |
| 6,955,782 B1 * | 10/2005 | Ratliff, Jr. | ........... | B29D 30/0629 264/326 |
| 6,983,781 B2 * | 1/2006 | Ebiko | .................. | B60C 13/001 152/523 |
| 7,497,240 B2 * | 3/2009 | Zimmer | ................. | B60C 11/00 152/209.19 |
| 7,500,499 B2 * | 3/2009 | Tanno | ..................... | B60C 17/04 152/155 |
| 8,794,284 B2 * | 8/2014 | Yamakawa | ........... | B60C 13/001 152/523 |
| 2002/0174928 A1 * | 11/2002 | Ratliff, Jr. | .............. | B60C 13/001 152/555 |
| 2003/0010417 A1 * | 1/2003 | Ratliff, Jr. | ........... | B60C 11/0302 152/209.18 |
| 2003/0041949 A1 * | 3/2003 | Takigawa | ............. | B60C 11/0318 156/123 |
| 2005/0098251 A1 * | 5/2005 | Yukawa | ................ | B60C 19/002 152/450 |
| 2005/0155686 A1 * | 7/2005 | Yukawa | .................... | B60B 3/04 152/450 |
| 2006/0137790 A1 * | 6/2006 | de Barsy | ................ | B60C 11/01 152/209.16 |
| 2006/0157178 A1 * | 7/2006 | Ibaraki | .................. | B60C 13/001 152/209.16 |
| 2006/0185777 A1 * | 8/2006 | Tanno | .................. | B60C 19/002 152/450 |
| 2006/0254689 A1 * | 11/2006 | Wallet | .................... | B60C 13/001 152/523 |
| 2006/0278318 A1 * | 12/2006 | Ibaraki | .................. | B60C 13/001 152/523 |
| 2007/0077139 A1 * | 4/2007 | Baugh | .................. | F04D 29/281 415/119 |
| 2007/0209431 A1 * | 9/2007 | Fujisawa | ................ | G01B 11/25 73/146 |
| 2008/0110539 A1 * | 5/2008 | Landers | ................ | B60C 11/0306 152/209.2 |
| 2009/0032161 A1 * | 2/2009 | Yamaguchi | ............. | B60C 13/02 152/523 |
| 2010/0000648 A1 * | 1/2010 | Nakano | .................. | B29C 33/10 152/523 |
| 2010/0043937 A1 * | 2/2010 | Matsunaga | ............... | B60C 5/14 152/564 |
| 2010/0193100 A1 * | 8/2010 | Ohashi | .................... | B60C 11/13 152/523 |
| 2010/0193101 A1 * | 8/2010 | Miyasaka | ............... | B60C 13/02 152/523 |
| 2010/0193102 A1 * | 8/2010 | Tsuruta | .................... | B60C 13/02 152/523 |
| 2010/0236683 A1 * | 9/2010 | Matsui | ................ | B60C 11/0083 152/517 |
| 2010/0258231 A1 * | 10/2010 | Nakamura | ............ | B60C 13/001 152/523 |
| 2010/0288409 A1 | 11/2010 | Ohara | | |
| 2010/0294412 A1 * | 11/2010 | Inoue | ...................... | B60C 13/02 152/523 |
| 2011/0030862 A1 * | 2/2011 | Hayashi | ............... | B60C 11/0083 152/209.14 |
| 2011/0041971 A1 * | 2/2011 | Kuroishi | ................. | B60C 13/02 152/153 |
| 2011/0088826 A1 | 4/2011 | Watanabe | | |
| 2011/0139326 A1 * | 6/2011 | Nukushina | ......... | B29D 30/0606 152/523 |
| 2012/0085473 A1 * | 4/2012 | Matsuo | ................ | B60C 1/0025 152/523 |
| 2012/0118466 A1 * | 5/2012 | Ebiko | .................... | B60C 13/02 152/523 |
| 2012/0318423 A1 * | 12/2012 | Yamakawa | ........... | B60C 13/001 152/523 |
| 2013/0000808 A1 * | 1/2013 | Ishida | ................... | B60C 13/001 152/523 |
| 2013/0025761 A1 * | 1/2013 | Yoshimi | ..................... | B60C 9/08 152/517 |
| 2013/0076108 A1 * | 3/2013 | Kubota | .................. | B60B 3/002 301/63.101 |
| 2013/0092303 A1 * | 4/2013 | Kleffmann | ............ | B60C 11/003 152/209.18 |
| 2013/0139938 A1 * | 6/2013 | Kouno | ..................... | B60C 5/01 152/209.18 |
| 2013/0263991 A1 * | 10/2013 | Fujii | ....................... | B60C 13/02 152/523 |
| 2014/0034205 A1 * | 2/2014 | Yukawa | ................ | B60C 17/0009 152/510 |
| 2014/0041782 A1 * | 2/2014 | Kudo | ..................... | B60C 13/02 152/523 |
| 2014/0048193 A1 * | 2/2014 | Yukawa | ............... | B60C 17/0045 152/510 |
| 2015/0000814 A1 * | 1/2015 | Mishima | ................ | B60C 15/024 152/523 |
| 2015/0013868 A1 * | 1/2015 | Mishima | ................ | B60C 13/003 152/454 |

(56) References Cited

U.S. PATENT DOCUMENTS

| | | | | |
|---|---|---|---|---|
| 2015/0041037 A1* | 2/2015 | Mukai | ............ | B60C 13/001 |
| | | | | 152/523 |
| 2015/0128690 A1* | 5/2015 | Park | ............ | B60C 11/0318 |
| | | | | 73/146 |
| 2015/0266347 A1* | 9/2015 | Kodama | ............ | B60C 13/02 |
| | | | | 152/523 |
| 2015/0290983 A1* | 10/2015 | Shmagranoff | ............ | B60C 13/02 |
| | | | | 152/523 |
| 2016/0016440 A1* | 1/2016 | Matsumura | ............ | B60C 13/02 |
| | | | | 152/523 |
| 2016/0207361 A1* | 7/2016 | Ferigo | ............ | B60C 11/01 |
| 2018/0200974 A1* | 7/2018 | Gueugneau | ............ | B29D 30/0606 |

FOREIGN PATENT DOCUMENTS

| | | |
|---|---|---|
| JP | 2001-206024 | 7/2001 |
| JP | 2009-029379 | 2/2009 |
| JP | 2009-029380 | 2/2009 |
| JP | 2009-029381 | 2/2009 |
| JP | 2009-160990 | 7/2009 |
| JP | 2009-279954 | 12/2009 |
| JP | 2010-260378 | 11/2010 |
| JP | 2010-264962 | 11/2010 |
| JP | 2011-168218 | 9/2011 |
| JP | 4818272 | 11/2011 |
| JP | 2011-246122 | 12/2011 |
| WO | WO 2007/032405 | 3/2007 |
| WO | WO 2009/017165 | 2/2009 |
| WO | WO 2009/084633 | 7/2009 |
| WO | WO 2009/142127 | 11/2009 |
| WO | WO 2010-126144 | 11/2010 |

OTHER PUBLICATIONS

Low_Brochure_Winter_tyres_2012_A4_EN—Nokian Tyres plc. See Image at p. 4, Row 1, col. 2 Jun. 2012 EN <http://www.nordmantyres.com/files/nordman/pdf/LOW_Brochure_Winter_tyres_2012_A4_EN.pdf> (Year: 2012).*

"Nokian" PDF <http://colesa.ru/news/9181>; selected images including<http://www.colesa.ru/images/Image/nokian-foto9-180211.jpg> and <"http://www.colesa.ru/images/Image/nokian-foto4-180211.jpg">. (Year: 2011).*

Flikr Image of Nokian Tire <https://www.flickr.com/photos/rezulteo/8740376001>; selected image at <https://c1.staticflickr.com/8/7286/8740376001_95aa9123b9_k.jpg>. (Year: 2011).*

International Search Report for International Application No. PCT/JP2013/067139 dated Aug. 13, 2013, 4 pages, Japan.

* cited by examiner

| | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 |
|---|---|---|---|---|---|---|---|---|---|---|---|
| RIDGE ARRANGEMENT (REFERENCE DIAGRAM) | ○ | ○ | ○ | ○ | ○ | ○ | ○ | ○ | ○ | ○ | ○ |
| RIDGES NON-UNIFORMLY DISPOSED AROUND THE TIRE CIRCUMFERENTIAL DIRECTION (FORM) | × (UNIFORM) | ○ (ANGLE) | ○ (ANGLE) | ○ (ANGLE) | ○ (ANGLE) | ○ (ANGLE) | ○ (ANGLE) | ○ (ANGLE) | ○ (ANGLE) | ○ (ANGLE) | ○ (ANGLE) |
| ANGLE RATIO FOR ANGLE VARIATION BETWEEN RIDGES | - | 0.98 | 1.03 | 0.95 | 1.05 | 0.7 | 1.3 | 0.7 | 0.7 | 0.7 | 0.7 |
| RANGE OF VARIATION IN LENGTH OF RIDGES WITH RESPECT TO THE TIRE SIDE SECTION [%] | - | - | - | - | - | - | - | - | - | - | - |
| RANGE OF VARIATION IN RIDGE HEIGHT (mm) | - | - | - | - | - | - | - | - | - | - | - |
| RANGE OF VARIATION IN RIDGE WIDTH (mm) | - | - | - | - | - | - | - | - | - | - | - |
| RECESS ARRANGEMENT | × | × | × | × | × | × | ○ | ○ | × | × | ○ |
| ARRANGEMENT OF RIDGES RELATIVE TO VEHICLE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| FUEL ECONOMY IMPROVEMENT RATE | 100 | 100 | 100 | 100 | 100 | 100 | 100 | 100.5 | 101 | 101.1 | 102 |
| NOISE LEVEL IMPROVEMENT RATE | 100 | 100 | 100 | 101 | 101 | 102 | 102 | 102 | 102 | 101 | 102 |

FIG. 25

| | CONVENTIONAL EXAMPLE | WORKING EXAMPLE 11 | WORKING EXAMPLE 12 | WORKING EXAMPLE 13 | WORKING EXAMPLE 14 | WORKING EXAMPLE 15 | WORKING EXAMPLE 16 | WORKING EXAMPLE 17 | WORKING EXAMPLE 18 | WORKING EXAMPLE 19 |
|---|---|---|---|---|---|---|---|---|---|---|
| RIDGE ARRANGEMENT (REFERENCE DIAGRAM) | ○ | ○ | ○ | ○ | ○ | ○ | ○ | ○ | ○ | ○ |
| RIDGES NON-UNIFORMLY DISPOSED AROUND THE TIRE CIRCUMFERENTIAL DIRECTION (FORM) | × (UNIFORM) | ○ (LENGTH) | ○ (LENGTH) | ○ (LENGTH) | ○ (LENGTH) | ○ (LENGTH) | ○ (LENGTH) | ○ (LENGTH) | ○ (LENGTH) | ○ (LENGTH) |
| ANGLE RATIO FOR ANGLE VARIATION BETWEEN RIDGES | - | - | - | - | - | - | - | - | - | - |
| RANGE OF VARIATION IN LENGTH OF RIDGES WITH RESPECT TO THE TIRE SIDE SECTION [%] | - | 5–80 | 10–95 | 10–80 | 30–90 | 30–80 | 30–80 | 30–80 | 30–80 | 30–80 |
| RANGE OF VARIATION IN RIDGE HEIGHT (mm) | - | - | - | - | - | - | - | - | - | - |
| RANGE OF VARIATION IN RIDGE WIDTH (mm) | - | - | - | - | - | - | - | - | - | - |
| RECESS ARRANGEMENT | × | × | × | × | × | × | ○ | × | × | ○ |
| ARRANGEMENT OF RIDGES RELATIVE TO VEHICLE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| FUEL ECONOMY IMPROVEMENT RATE | 100 | 100 | 100 | 100 | 100 | 100 | 100.5 | 101 | 101.1 | 102 |
| NOISE LEVEL IMPROVEMENT RATE | 100 | 100 | 100 | 101 | 101 | 102 | 102 | 102 | 101 | 102 |

FIG. 26

| | CONVENTIONAL EXAMPLE | WORKING EXAMPLE 20 | WORKING EXAMPLE 21 | WORKING EXAMPLE 22 | WORKING EXAMPLE 23 | WORKING EXAMPLE 24 | WORKING EXAMPLE 25 | WORKING EXAMPLE 26 | WORKING EXAMPLE 27 | WORKING EXAMPLE 28 |
|---|---|---|---|---|---|---|---|---|---|---|
| RIDGE ARRANGEMENT (REFERENCE DIAGRAM) | ○ | ○ | ○ | ○ | ○ | ○ | ○ | ○ | ○ | ○ |
| RIDGES NON-UNIFORMLY DISPOSED AROUND THE TIRE CIRCUMFERENTIAL DIRECTION (FORM) | × (UNIFORM) | ○ (HEIGHT) | ○ (HEIGHT) | ○ (HEIGHT) | ○ (HEIGHT) | ○ (HEIGHT) | ○ (HEIGHT) | ○ (HEIGHT) | ○ (HEIGHT) | ○ (HEIGHT) |
| ANGLE RATIO FOR ANGLE VARIATION BETWEEN RIDGES | - | - | - | - | - | - | - | - | - | - |
| RANGE OF VARIATION IN LENGTH OF RIDGES WITH RESPECT TO THE TIRE SIDE SECTION [%] | - | - | - | - | - | - | - | - | - | - |
| RANGE OF VARIATION IN RIDGE HEIGHT (mm) | - | 0.5 | 11 | 1 | 10 | 6 | 6 | 6 | 6 | 6 |
| RANGE OF VARIATION IN RIDGE WIDTH (mm) | - | - | - | - | - | - | - | - | - | - |
| RECESS ARRANGEMENT | × | × | × | × | × | × | ○ | × | × | ○ |
| ARRANGEMENT OF RIDGES RELATIVE TO VEHICLE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| FUEL ECONOMY IMPROVEMENT RATE | 100 | 100 | 100 | 100 | 100 | 100 | 100.5 | 101 | 101.1 | 102 |
| NOISE LEVEL IMPROVEMENT RATE | 100 | 100 | 100 | 101 | 101 | 102 | 102 | 102 | 101.5 | 102 |

FIG. 27

| | CONVENTIONAL EXAMPLE | WORKING EXAMPLE 29 | WORKING EXAMPLE 30 | WORKING EXAMPLE 31 | WORKING EXAMPLE 32 | WORKING EXAMPLE 33 | WORKING EXAMPLE 34 | WORKING EXAMPLE 35 | WORKING EXAMPLE 36 | WORKING EXAMPLE 37 |
|---|---|---|---|---|---|---|---|---|---|---|
| RIDGE ARRANGEMENT (REFERENCE DIAGRAM) | ○ | ○ | ○ | ○ | ○ | ○ | ○ | ○ | ○ | ○ |
| RIDGES NON-UNIFORMLY DISPOSED AROUND THE TIRE CIRCUMFERENTIAL DIRECTION (FORM) | × (UNIFORM) | ○ (WIDTH) | ○ (WIDTH) | ○ (WIDTH) | ○ (WIDTH) | ○ (WIDTH) | ○ (WIDTH) | ○ (WIDTH) | ○ (WIDTH) | ○ (WIDTH) |
| ANGLE RATIO FOR ANGLE VARIATION BETWEEN RIDGES | - | - | - | - | - | - | - | - | - | - |
| RANGE OF VARIATION IN LENGTH OF RIDGES WITH RESPECT TO THE TIRE SIDE SECTION [%] | - | - | - | - | - | - | - | - | - | - |
| RANGE OF VARIATION IN RIDGE HEIGHT (mm) | - | - | - | - | - | - | - | - | - | - |
| RANGE OF VARIATION IN RIDGE WIDTH (mm) | - | 0.4 | 6 | 0.5 | 5 | 3 | 3 | 3 | 3 | 3 |
| RECESS ARRANGEMENT | × | × | × | × | × | × | ○ | × | × | ○ |
| ARRANGEMENT OF RIDGES RELATIVE TO VEHICLE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| FUEL ECONOMY IMPROVEMENT RATE | 100 | 100 | 100 | 100 | 100 | 100 | 100.5 | 101 | 101.1 | 102 |
| NOISE LEVEL IMPROVEMENT RATE | 100 | 100 | 100 | 101 | 102 | 102 | 102 | 102 | 101.5 | 102 |

FIG. 28

PNEUMATIC TIRE

TECHNICAL FIELD

The present technology relates to a pneumatic tire and particularly relates to a pneumatic tire having improved air flow around the tire.

BACKGROUND

Conventionally, for example, in Japanese Unexamined Patent Application Publication No. 2010-260378, a pneumatic tire is disclosed in which a plurality of ridges (projections) extending in the tire radial direction is provided at predetermined intervals in the tire circumferential direction on the tire side section (tire side surface) on the inner side in the vehicle width direction when mounted on a vehicle, and a plurality of recesses is provided over the tire circumferential direction and the tire radial direction on the tire side section on the outer side in the vehicle width direction when mounted on a vehicle. When mounted on a vehicle, air flows uniformly toward the rear on the outer side in the vehicle width direction, but on the inner side in the vehicle width direction, the tire is disposed within the tire house, and other components such as the axle and the like are disposed nearby, so the flow of the air is easily disturbed. According to this pneumatic tire, an air distribution promotion effect and streamlining effect are obtained and the air resistance is reduced by the ridges provided on the tire side section on the inner side in the vehicle width direction where the air flow is easily disturbed, and turbulent flow is produced when the vehicle is traveling by the recesses provided on the tire side section on the outer side in the vehicle width direction, the drag force that tends to pull the tire backward due to the low pressure portion produced to the rear of the tire when traveling is reduced, so the fuel economy is improved.

Japanese Patent No. 4818272, for example, discloses a conventional pneumatic tire (run flat tire) configured so that recesses and ridges constituted by grooves and ridges extend along at least part of a tire side section. The ridges of Japanese Patent No. 4818272 satisfy the relationships $1.0 \le p/h\ 50.0$ and $1.0 \le (p-w)/w \le 100.0$, wherein h is height, p is pitch, and w is width. This pneumatic tire promotes heat dissipation by increasing the surface area of the tire, thereby allowing for reduced temperatures at the tire side sections, which are especially prone to degradation in a run flat tire.

Although it is possible to improve fuel economy by providing ridges on a tire side section, as in the case of the pneumatic tire disclosed in Japanese Unexamined Patent Application Publication No. 2010-260378 as described above, an increase in noise such as wind noise can be expected at specific frequencies if the ridges are uniformly disposed with respect to the tire circumferential direction and the tire radial direction, potentially increasing vehicle interior noise. In addition, the recesses and ridges are intermittently disposed along the tire circumferential direction in the pneumatic tire disclosed in Japanese Patent No. 4818272. However, an increase in noise such as wind noise can be expected at specific frequencies if the spacing is uniform both between ridges and between recesses in a section comprising recesses and ridges, potentially increasing noise within vehicle interior.

SUMMARY

The present technology provides a pneumatic tire that maintains vehicle air resistance reduction effects and is capable of reducing vehicle interior noise.

A pneumatic tire according to a first aspect of the present technology is a pneumatic tire having a plurality of long radially extending ridges disposed at intervals in a tire circumferential direction on at least one tire side section; the ridges being non-uniformly disposed around the tire circumferential direction.

According to the pneumatic tire according to this aspect, by obtaining an air distribution promotion effect and streamlining effect at the maximum tire width position, which are the main factors for increasing the air resistance of the vehicle as a result of the ridges provided in the tire side section including the tire maximum width position, the vehicle air resistance reduction effect for a vehicle to which the pneumatic tire has been mounted is maintained, and it is possible to improve the fuel economy of the vehicle. Moreover, in accordance with the pneumatic tire according to this aspect, the ridges are non-uniformly disposed around the tire circumferential direction, thereby dispersing noise that can be produced when air strikes or rushes over the ridges over a wide range of frequencies and allowing for reduced vehicle interior noise.

A pneumatic tire according to a second aspect of the present technology is the pneumatic tire according to the first aspect, wherein the ridges are disposed around the tire circumferential direction at varied angles between the ridges.

In accordance with the pneumatic tire according to this aspect, an arrangement in which the ridges are non-uniformly disposed around the tire circumferential direction, i.e., the pitch between the ridges around the tire circumferential direction is non-uniform, can be created, thereby maintaining vehicle air resistance reduction effects and allowing vehicle interior noise reduction effects to be obtained.

A pneumatic tire according to a third aspect of the present technology is the pneumatic tire according to the second aspect, wherein the variation in angle between the ridges is such that the angles have a ratio of 0.95 or less or 1.05 or greater.

In accordance with the pneumatic tire according to this aspect, the angles between ridges are varied within the range described above, thereby allowing marked vehicle interior noise reduction effects to be obtained.

A pneumatic tire according to a fourth aspect of the present technology is the pneumatic tire according to the first aspect, wherein the ridges are disposed around the tire circumferential direction at varied lengthwise-directional lengths.

In accordance with the pneumatic tire according to this aspect, an arrangement in which the ridges are non-uniformly disposed around the tire circumferential direction can be created, thereby maintaining vehicle air resistance reduction effects and allowing vehicle interior noise reduction effects to be obtained.

A pneumatic tire according to a fifth aspect of the present technology is the pneumatic tire according to the fourth aspect, wherein the lengths of the ridges vary within a range of 10% to 90% of the dimensions of the tire side section with respect to a tire radial direction.

In accordance with the pneumatic tire according to this aspect, the lengthwise-directional lengths of the ridges are varied within the range described above, thereby allowing marked vehicle interior noise reduction effects to be obtained.

A pneumatic tire according to a sixth aspect of the present technology is the pneumatic tire according to the first aspect, wherein the ridges are disposed around the tire circumferential direction at varied heights of projection from the tire side section.

In accordance with the pneumatic tire according to this aspect, an arrangement in which the ridges are non-uniformly disposed around the tire circumferential direction can be created, thereby maintaining vehicle air resistance reduction effects and allowing vehicle interior noise reduction effects to be obtained.

A pneumatic tire according to a seventh aspect of the present technology is the pneumatic tire according to the sixth aspect, wherein the heights of the ridges disposed at varying heights vary within a range of 1 mm to 10 mm.

In accordance with the pneumatic tire according to this aspect, the heights of the ridges are varied within the range described above, thereby allowing marked vehicle interior noise reduction effects to be obtained.

A pneumatic tire according to an eighth aspect of the present technology is the pneumatic tire according to the first aspect, wherein the ridges are disposed around the tire circumferential direction at varied lateral-directional widths.

In accordance with the pneumatic tire according to this aspect, an arrangement in which the ridges are non-uniformly disposed around the tire circumferential direction can be created, thereby maintaining vehicle air resistance reduction effects and allowing vehicle interior noise reduction effects to be obtained.

A pneumatic tire according to a ninth aspect of the present technology is the pneumatic tire according to the eighth aspect, wherein the widths of the ridges disposed at varying widths vary within a range of 0.5 mm to 5 mm.

In accordance with the pneumatic tire according to this aspect, the widths of the ridges are varied within the range described above, thereby allowing marked vehicle interior noise reduction effects to be obtained.

A pneumatic tire according to a tenth aspect of the present technology is the pneumatic tire according to any one of the first through ninth aspects, wherein the ridges are disposed on one tire side section, and a plurality of recesses is disposed on another tire side section.

For example, if the ridges are provided on the tire side section facing the outside of the vehicle and the recesses are provided on the tire side section facing the inside of the vehicle when mounted on a vehicle, the flow of air from the front side to the rear side of the vehicle is made turbulent on the vehicle inner side of the pneumatic tire when the air is passing between the pneumatic tire and the vehicle, due to the recesses. Also, on the vehicle outer side of the pneumatic tire, the air that passes the vehicle outer side is made turbulent due to the ridges. Therefore, a turbulent flow boundary layer is generated on the periphery of the pneumatic tire, so on the vehicle inner side, expansion of air that escapes the vehicle outer side to the rear of the vehicle is suppressed, and on the vehicle outer side, expansion of the air passing the vehicle outer side of the pneumatic tire is suppressed. As a result, the spread of the passing air is suppressed, so the air resistance of the vehicle is reduced, and the fuel economy can be further improved.

A pneumatic tire according to an eleventh aspect of the present technology is the pneumatic tire according to any one of the first through tenth aspects, wherein the tire has a designated orientation with respect to the inside and outside of the vehicle when mounted thereupon, and the ridges are disposed on a tire side section facing the inside of the vehicle.

The flow of air from the front side to the rear side of the vehicle is promoted and streamlined by the ridges on the vehicle inner side of the pneumatic tire. Therefore, turbulence of the air flow passing the vehicle inner side of the pneumatic tire is suppressed. On the other hand, the air flow from the front to the rear of the vehicle is made turbulent by the recesses on the vehicle outer side of the pneumatic tire, so a turbulent flow boundary layer is generated at the periphery of the pneumatic tire, and separation from the pneumatic tire is suppressed. Therefore, spreading of the air flow passing the vehicle outer side of the pneumatic tire is suppressed. As a result, the spreading of the passing air is suppressed, so the air resistance of the vehicle is further reduced, and it is possible to further improve the fuel economy.

The pneumatic tire according to the present technology maintains vehicle air resistance reduction effects and is capable of reducing vehicle interior noise.

BRIEF DESCRIPTION OF THE DRAWINGS

FIG. 25 is a table showing results of performance tests of pneumatic tires according to examples of the present technology.

FIG. 26 is a table showing results of performance tests of pneumatic tires according to examples of the present technology.

FIG. 27 is a table showing results of performance tests of pneumatic tires according to examples of the present technology.

FIG. 28 is a table showing results of performance tests of pneumatic tires according to examples of the present technology.

DETAILED DESCRIPTION

Embodiments of the present technology are described below in detail based on the drawings. However, the present technology is not limited to these embodiments. The constituents of the embodiments include constituents that can be easily replaced by those skilled in the art and constituents substantially the same as the constituents of the embodiments. Furthermore, a plurality of modified examples that are described in the embodiments can be freely combined within a scope of obviousness for a person skilled in the art.

Figure 1:
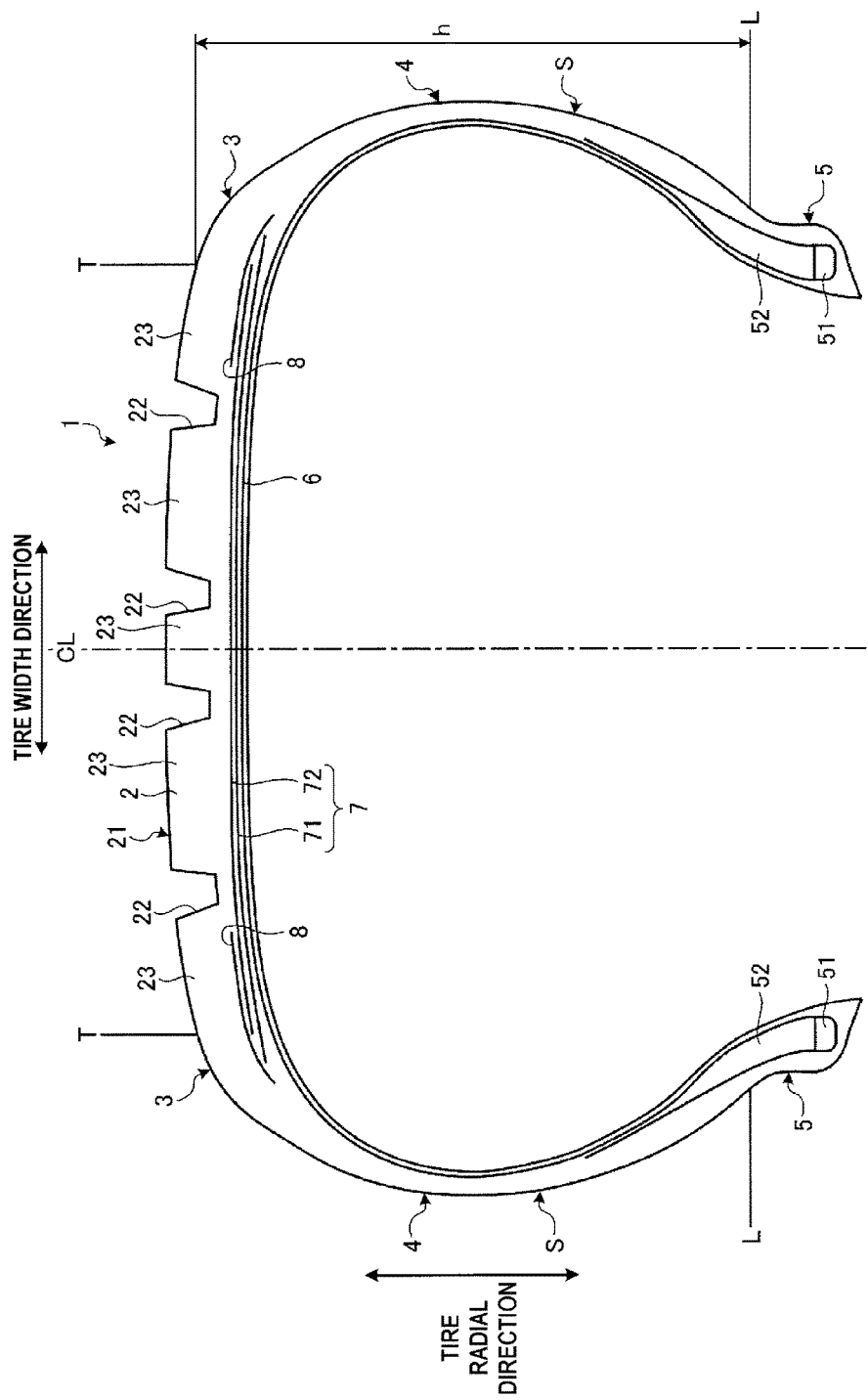
FIG. 1 is a meridian cross-sectional view of a pneumatic tire according to an embodiment of the present technology.

FIG. 1 is a meridian cross-sectional view of a pneumatic tire according to this embodiment. In the following description, "tire radial direction" refers to a direction orthogonal to the rotational axis (not illustrated) of a pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread section 2, shoulder sections 3 on both sides of the tread section 2, and a side wall section 4 and a bead section 5 continuing sequentially from each of the shoulder sections 3. Additionally, the pneumatic tire 1 includes a carcass layer 6, a belt layer 7, and a belt reinforcing layer 8.

The tread section 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread section 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land sections 23 extending along the tire circumferential direction and parallel with the tire equator line CL is formed in the tread surface 21 by the plurality of main grooves 22. Additionally, while not explicitly illustrated in the drawings, lug grooves that intersect with the main grooves 22 in each of the land sections 23 are provided in the tread surface 21. The land sections 23 are plurally divided in the tire circumferential direction by the lug grooves. Additionally, the lug grooves are formed so as to open to an outermost side in the tire width direction of the tread section 2, that is, the outer side in the tire width direction. Note that the lug grooves may have a form that communicates with the main grooves 22 or may have a form that does not communicate with the main grooves 22.

The shoulder sections 3 are locations on both outer sides in the tire width direction of the tread section 2. Additionally, the side wall sections 4 are exposed at an outermost side in the tire width direction of the pneumatic tire 1. The bead sections 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) disposed parallel to each other in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread section 2; and covers the carcass layer 6 in the tire circumferential direction. The belts 71 and 72 are constituted by a plurality of cords (not illustrated) disposed parallel to each other at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), disposed parallel to each other in the tire width direction and substantially parallel (±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

First Embodiment

Figure 2:
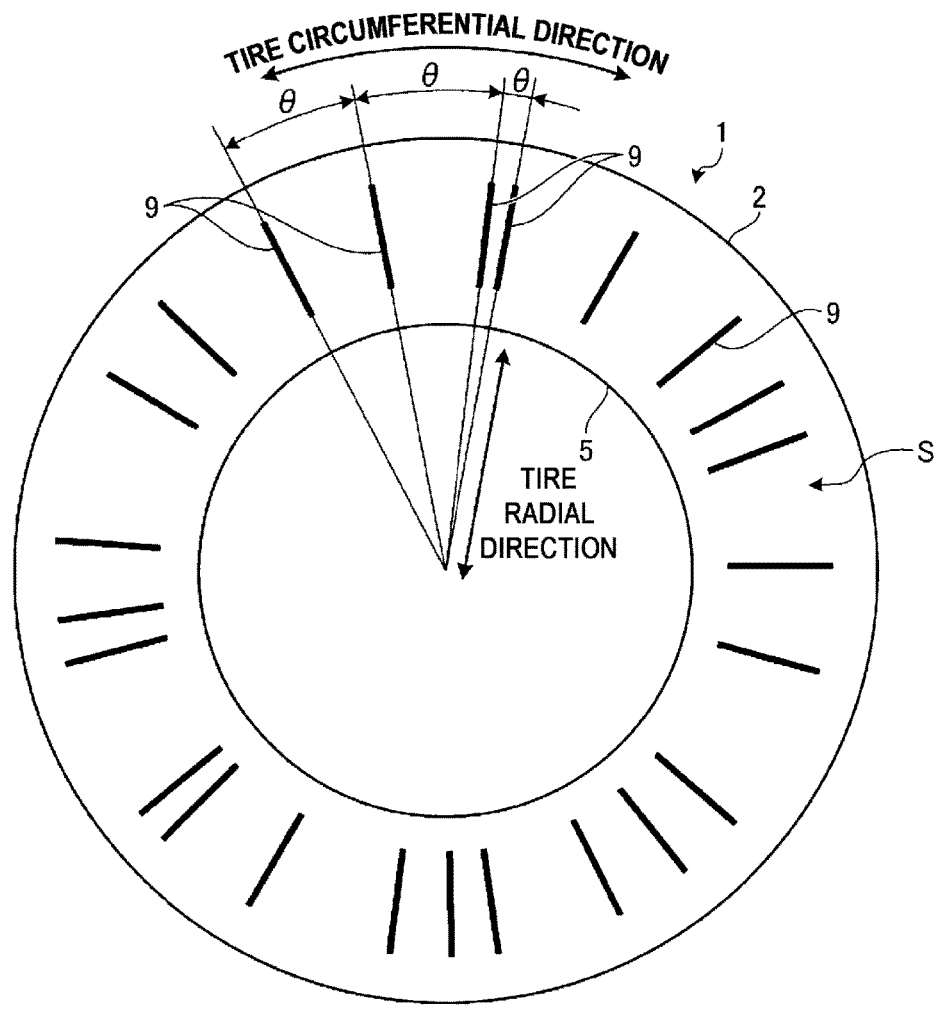
FIG. 2 is an external view of the pneumatic tire according to a first embodiment of the present technology as viewed from the tire width direction.
Figure 3:
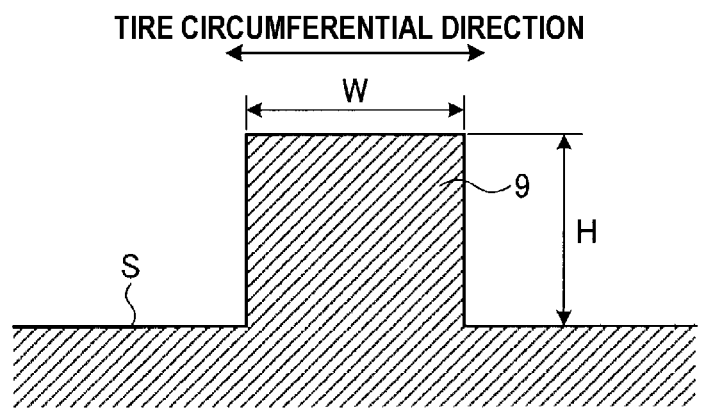
FIG. 3 is a cross-sectional view in the lateral direction of a ridge.
Figure 4:
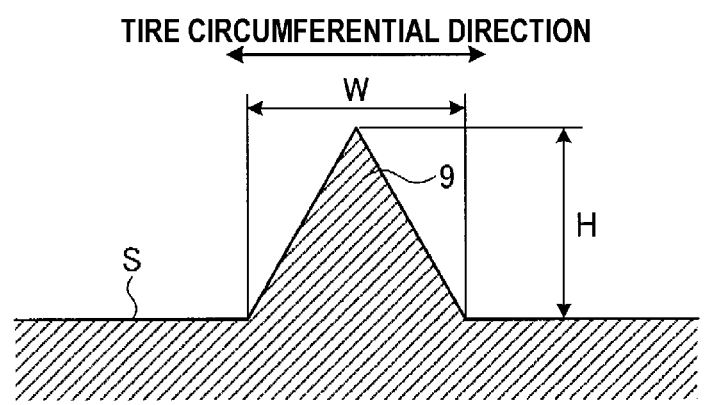
FIG. 4 is a cross-sectional view in the lateral direction of a ridge.
Figure 5:
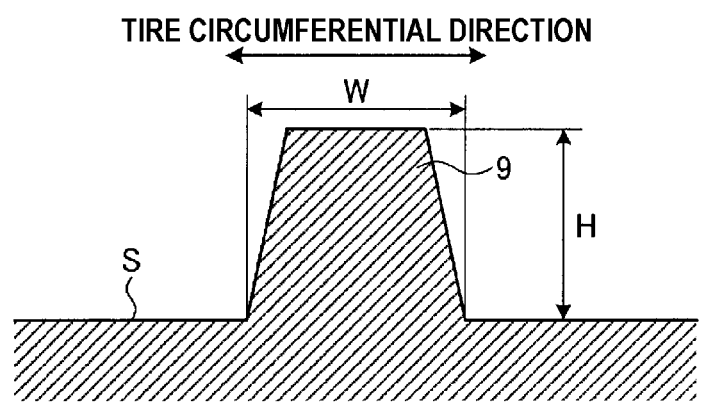
FIG. 5 is a cross-sectional view in the lateral direction of a ridge.
Figure 6:
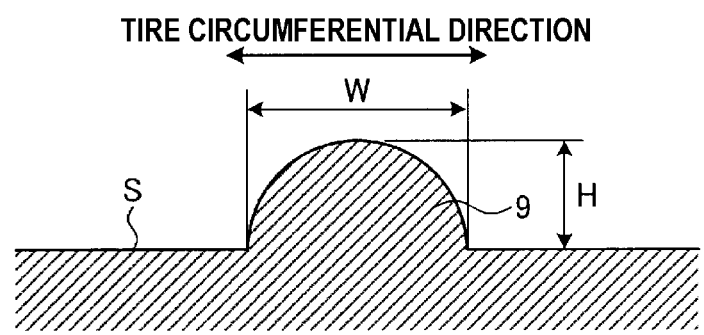
FIG. 6 is a cross-sectional view in the lateral direction of a ridge.

FIG. 2 is an external view of a pneumatic tire according to the present embodiment as viewed from the tire width direction, and FIGS. 3 to 9 are lateral direction cross-sectional views of ridges. FIGS. 10 to 15 depict other examples of pneumatic tires according to the present embodiment As illustrated in FIG. 2, a plurality of ridges 9 that project outward from the surface of a tire side section S of the pneumatic tire 1 configured as illustrated in FIG. 1 is provided on the tire side section S.

Here, the "tire side section S" refers to, in FIG. 1, the outer side in the tire width direction from a ground contact edge T of the tread section 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread section 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead sections 5.

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

As illustrated in FIG. 2, the ridges 9 are formed as long projections that extend in the tire radial direction within the tire side section S and are constituted by a rubber material (which may be the rubber material constituting the tire side section S or a different rubber material), and a plurality thereof are disposed at intervals in the tire circumferential direction.

Figure 7:
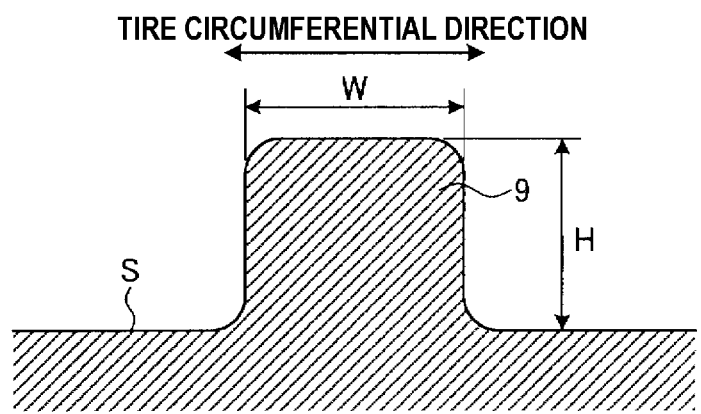
FIG. 7 is a cross-sectional view in the lateral direction of a ridge.
Figure 8:
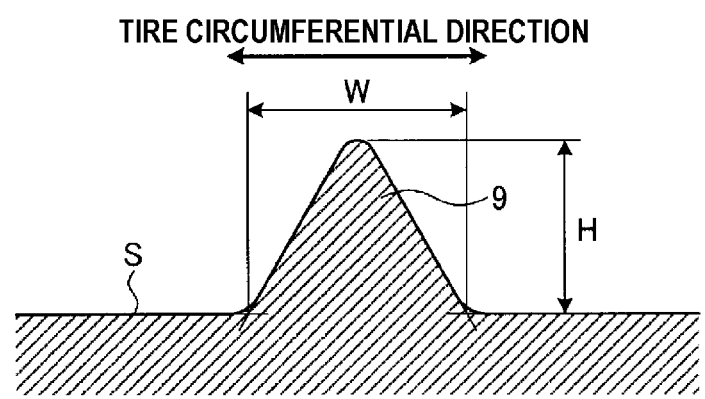
FIG. 8 is a cross-sectional view in the lateral direction of a ridge.
Figure 9:
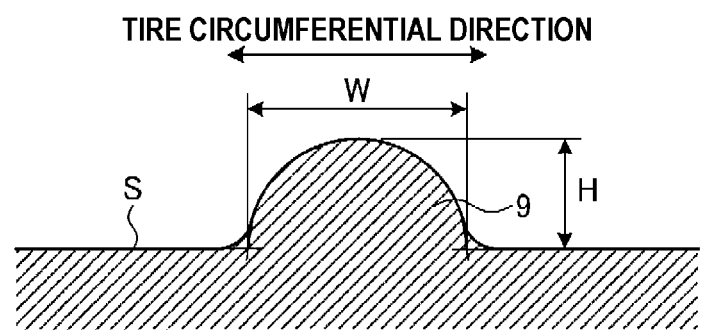
FIG. 9 is a cross-sectional view in the lateral direction of a ridge.

The ridges 9 are formed so that the lateral direction cross-sectional shapes thereof are as illustrated, for example, in FIGS. 3 to 9. The ridge 9 illustrated in FIG. 3 has a cross-sectional shape in the lateral direction that is a rectangular shape. The ridge 9 illustrated in FIG. 4 has a cross-sectional shape in the lateral direction that is a triangular shape. The ridge 9 illustrated in FIG. 5 has a cross-sectional shape in the lateral direction that is a trapezoidal shape. In addition, while not explicitly illustrated in the drawings, the cross-sectional shape in the lateral direction of the ridges 9 may be various shapes such as a triangular shape on the top of rectangular shape, or a zigzag shape on the top of rectangular shape. Also, the cross-sectional shape in the lateral direction of the ridges 9 may have an external form based on curved lines. The ridge 9 illustrated in FIG. 6 has a cross-sectional shape in the lateral direction that is a semi-circular shape. In addition, while not explicitly illustrated in the drawings, the cross-sectional shape in the lateral direction of the ridges 9 may have various shapes such as, for example, a semi-oval shape or a semi-elliptical shape. Also, the cross-sectional shape in the lateral direction of the ridges 9 may have an external form that is a combination of straight lines and curves. The ridge 9 illustrated in FIG. 7 has a cross-sectional shape in the lateral direction that is a rectangular shape whose corners are curved. The ridge 9 illustrated in FIG. 8 has a cross-sectional shape in the lateral direction that is a triangular shape whose corners are curved. In addition, while not illustrated in the drawings, the shape may be various shapes such as a waveform on the top of rectangular shape. Also, as illustrated in FIGS. 7 to 9, the cross-sectional shape in the lateral direction of the ridges 9 may have a shape in which the base portion that projects from the tire side section S is curved. In the present embodiment, the ridges 9 have uniform lengthwise-directional lengths N and cross-sectional shapes (protruding heights H from the tire side section S and lateral-directional widths W).

The ridges 9 are non-uniformly disposed in the tire circumferential direction. Specifically, in the pneumatic tire 1 of the present embodiment, the ridges 9 are disposed in the tire circumferential direction at varied angles θ between the ridges 9.

"Variation" in the angles θ between the ridges 9 takes the form, for example, of the angle θ between adjacent ridges 9 in the tire circumferential direction, being different from the angle θ between other ridges 9, and the arrangement of these different angles θ around the tire circumferential direction being non-uniform and non-constant, as illustrated in FIG. 2.

Figure 10:
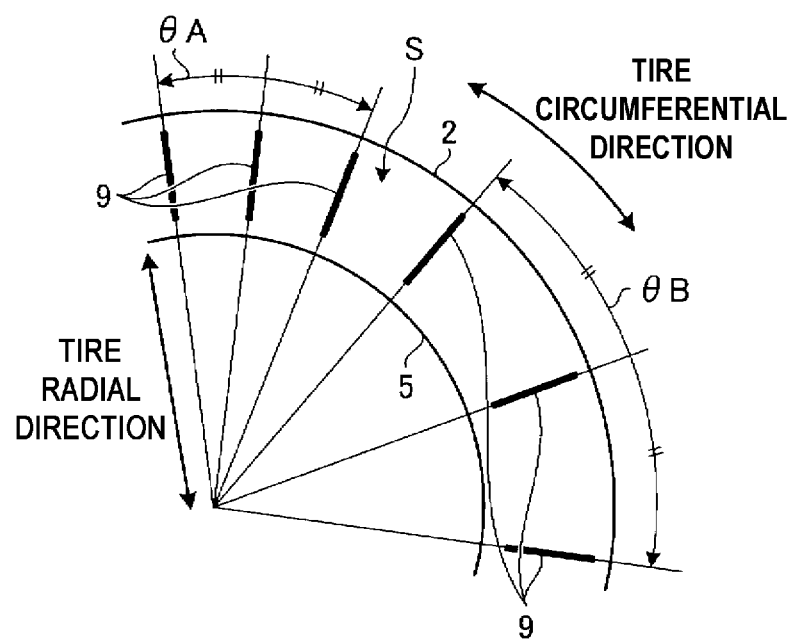
FIG. 10 is a partial external view of another example of a pneumatic tire according to the first embodiment of the present technology as viewed from the tire width direction.

Variation in the angles θ between the ridges 9 can also take the form, for example, of a non-uniform, non-constant arrangement around the tire circumferential direction of a set θA in which the angle between a plurality of adjacent ridges 9 is the same and a set θB in which the angle θ between a plurality of adjacent ridges 9 is an identical angle different from that of set θA, as illustrated in FIG. 10.

Figure 11:
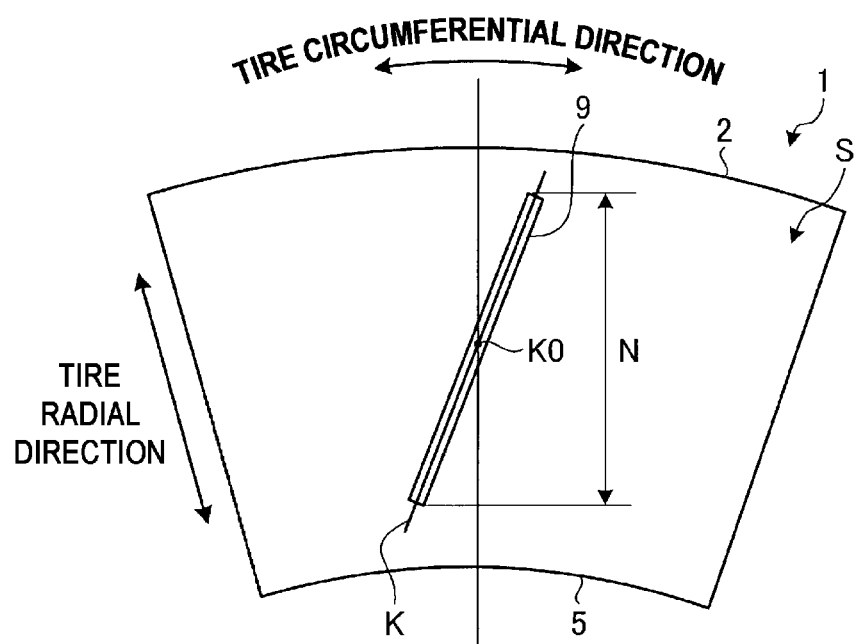
FIG. 11 is a partial external view of another example of a pneumatic tire according to the first embodiment of the present technology as viewed from the tire width direction.
Figure 12:
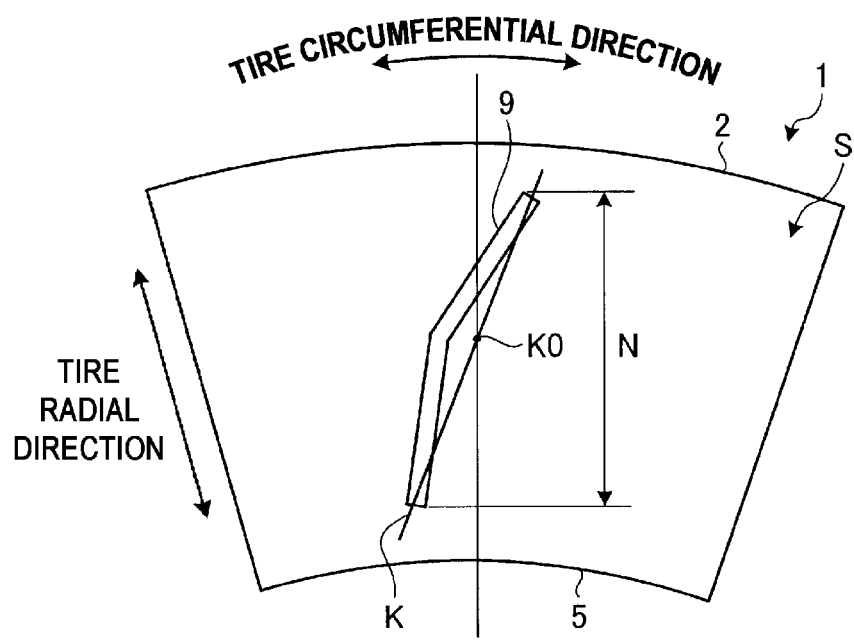
FIG. 12 is a partial external view of another example of a pneumatic tire according to the first embodiment of the present technology as viewed from the tire width direction.
Figure 13:
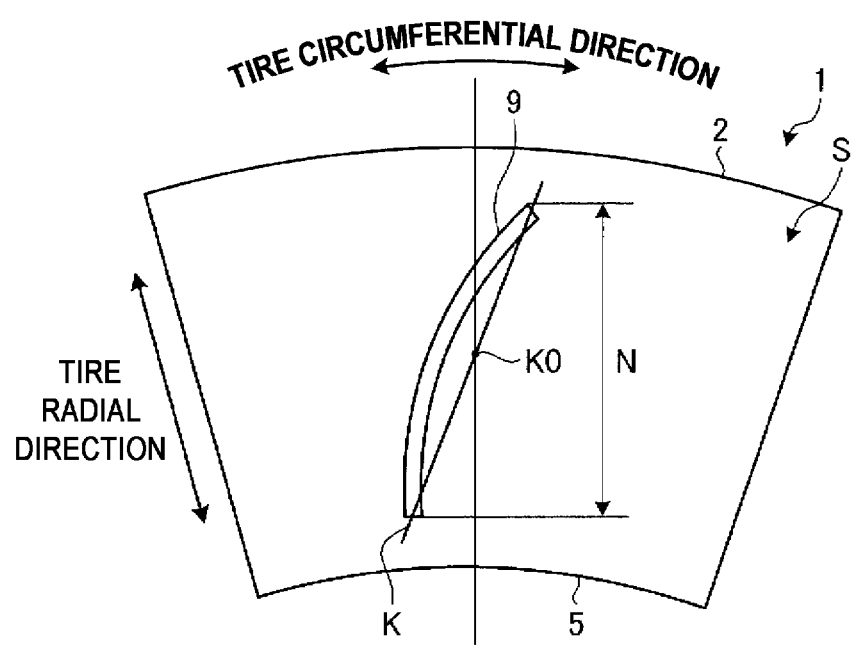
FIG. 13 is a partial external view of another example of a pneumatic tire according to the first embodiment of the present technology as viewed from the tire width direction.
Figure 14:
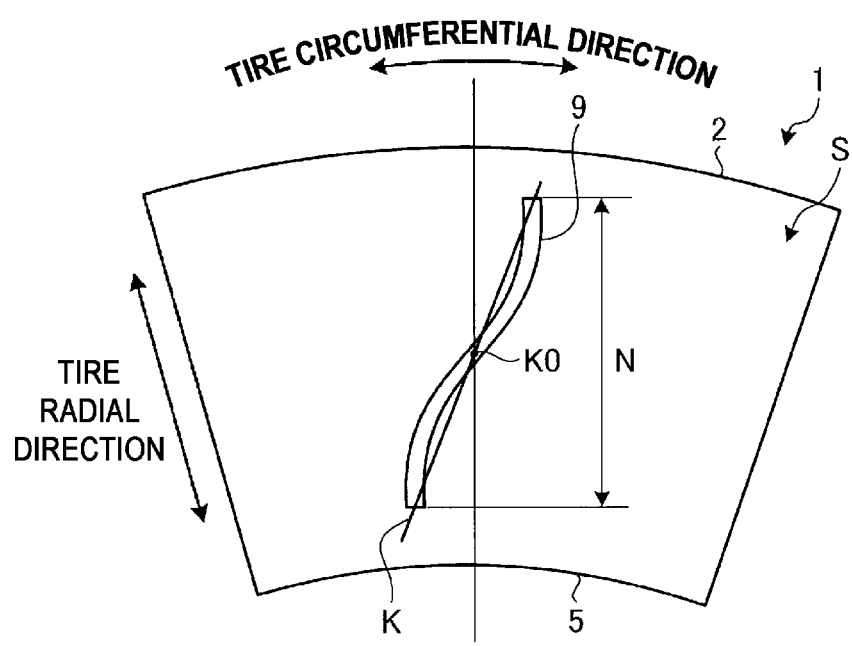
FIG. 14 is a partial external view of another example of a pneumatic tire according to the first embodiment of the present technology as viewed from the tire width direction.

If the ridges 9 extend in straight lines in the tire radial direction, as illustrated in FIGS. 2 and 11, the angles θ between ridges 9 are expressed by the directions in which the ridges 9 extend. By contrast, if the ridges 9 are oblique with respect to the tire radial direction as illustrated in FIG. 11, bent as illustrated in FIG. 12, curved as illustrated in FIG. 13, meander as illustrated in FIG. 14, or zigzagging (not illustrated in the drawings), the position of the center K0 of a reference line K connecting both ends of the ridge 9 in the tire radial direction serves as the basis for angle θ.

Figure 15:
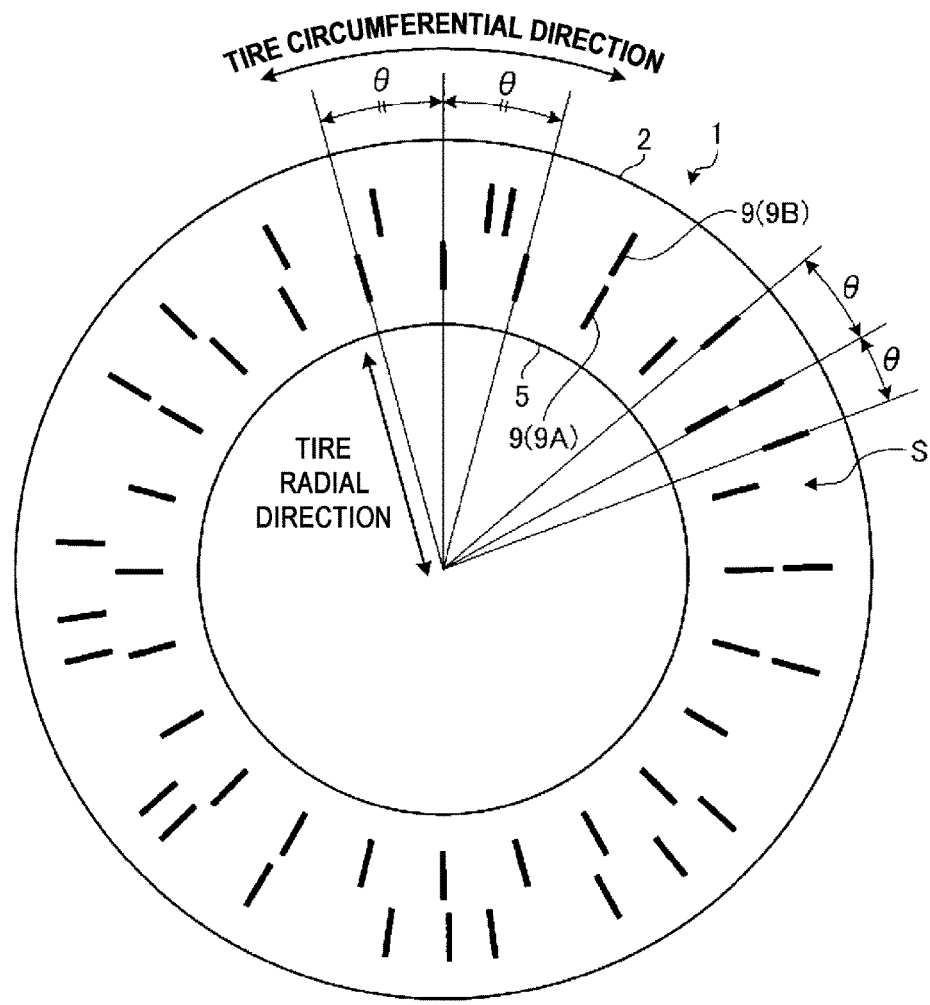
FIG. 15 is an external view of another example of a pneumatic tire according to a second embodiment of the present technology as viewed from the tire width direction.

The ridges 9 may also be divided along the tire radial direction. In such cases, for example, divided ridges 9A positioned further inward in the tire radial direction are disposed around the tire circumferential direction with uniform angles θ between the ridges 9, and divided ridges 9B positioned further outward in the tire radial direction are disposed around the tire circumferential direction with varied angles θ between the ridges 9, as illustrated in FIG. 15. Also possible is an arrangement, not illustrated in the drawings, in which divided ridges 9A positioned further inward in the tire radial direction are disposed around the tire circumferential direction with varied angles θ between the ridges 9 and divided ridges 9B positioned further outward in the tire radial direction are disposed around the tire circumferential direction with uniform angles θ between the ridges 9. Also possible is an arrangement, not illustrated in the drawings, in which divided ridges 9A positioned further inward in the tire radial direction and ridges 9B positioned further outward in the tire radial direction are disposed around the tire circumferential direction with varied angles θ between the ridges 9. Apart from the embodiment illustrated in FIG. 15, the ridges may be divided into three sections in the tire radial direction in arrangements in which the ridges 9 are divided. The ridges 9 may also be formed overlapping each other in the tire circumferential direction in arrangements featuring divided ridges.

In this way, the pneumatic tire 1 according to the present embodiment is a pneumatic tire 1 having a plurality of long radially extending ridges 9 disposed at intervals in the tire circumferential direction on at least one tire side section S, wherein the ridges 9 are non-uniformly disposed around the tire circumferential direction.

In accordance with the pneumatic tire 1 according to the present embodiment, an air distribution promotion effect and streamlining effect is yielded at the tire side section S by the ridges 9 provided on the tire side section S, thereby maintaining vehicle air resistance reduction effects for the vehicle on which the pneumatic tire 1 is mounted, and allowing for improved vehicle fuel economy. Moreover, in accordance with the pneumatic tire 1 according to the present embodiment, the ridges 9 are non-uniformly disposed around the tire circumferential direction, thereby dispersing noise over a wide range of frequencies that can be produced when air strikes or rushes over the ridges 9 and allowing for reduced vehicle interior noise.

In addition, the ridges 9 are disposed in the tire circumferential direction at varied angles θ between the ridges 9.

In accordance with the pneumatic tire 1 according to the present embodiment, an arrangement in which the ridges 9 are non-uniformly disposed around the tire circumferential direction, i.e., the pitch between the ridges 9 around the tire circumferential direction is non-uniform, can be realized, thereby maintaining vehicle air resistance reduction effects and allowing vehicle interior noise reduction effects to be obtained. It is also possible to divide the ridges 9 in the tire radial direction and dispose the ridges 9 with varied angles θ therebetween in the tire circumferential direction; this allows for an arrangement in which the ridges 9 are non-uniformly disposed around the tire circumferential direction, thereby maintaining vehicle air resistance reduction effects and allowing vehicle interior noise reduction effects to be obtained.

In the pneumatic tire 1 according to the present embodiment, the variation in the angles θ between the ridges 9 is preferably such that the angle ratio is in a range of 0.95 or less or 1.05 or greater.

In accordance with the pneumatic tire 1 according to the present embodiment, the angles θ between the ridges 9 are varied within the range described above, thereby allowing marked vehicle interior noise reduction effects to be obtained.

Second Embodiment

Figure 16:
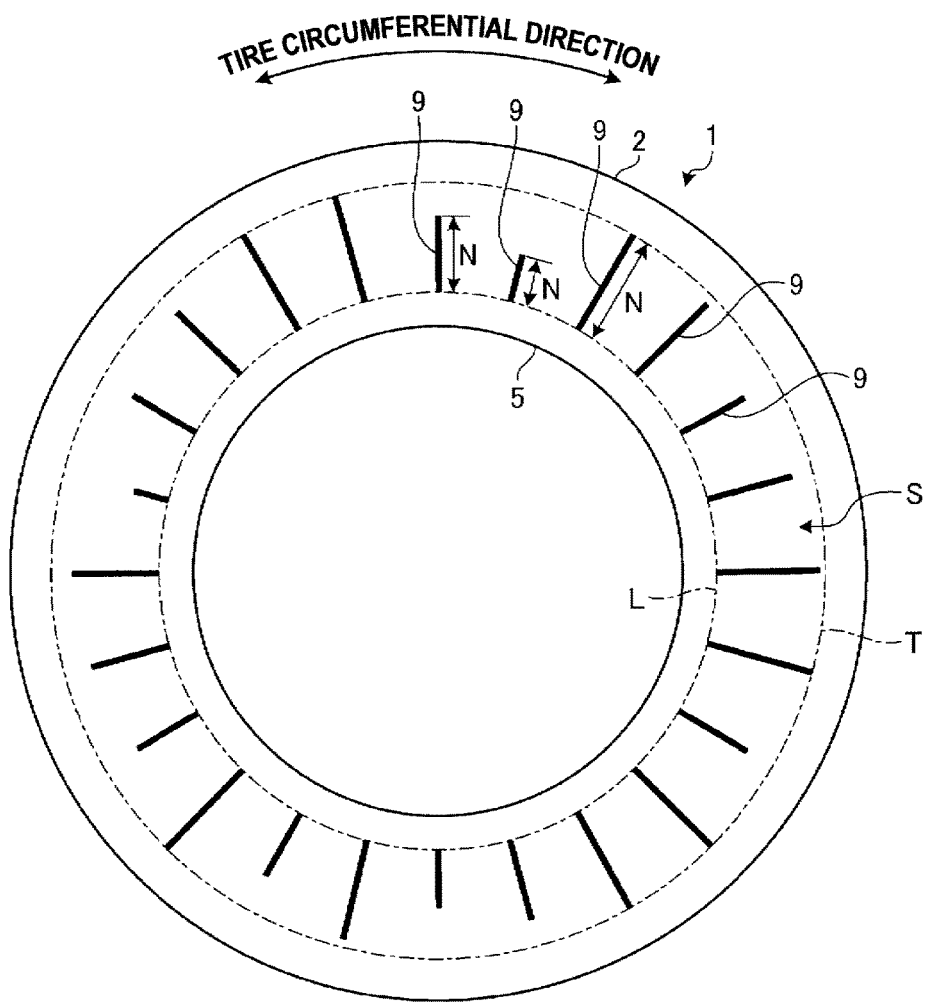
FIG. 16 is an external view of another example of a pneumatic tire according to the second embodiment of the present technology as viewed from the tire width direction.
Figure 17:
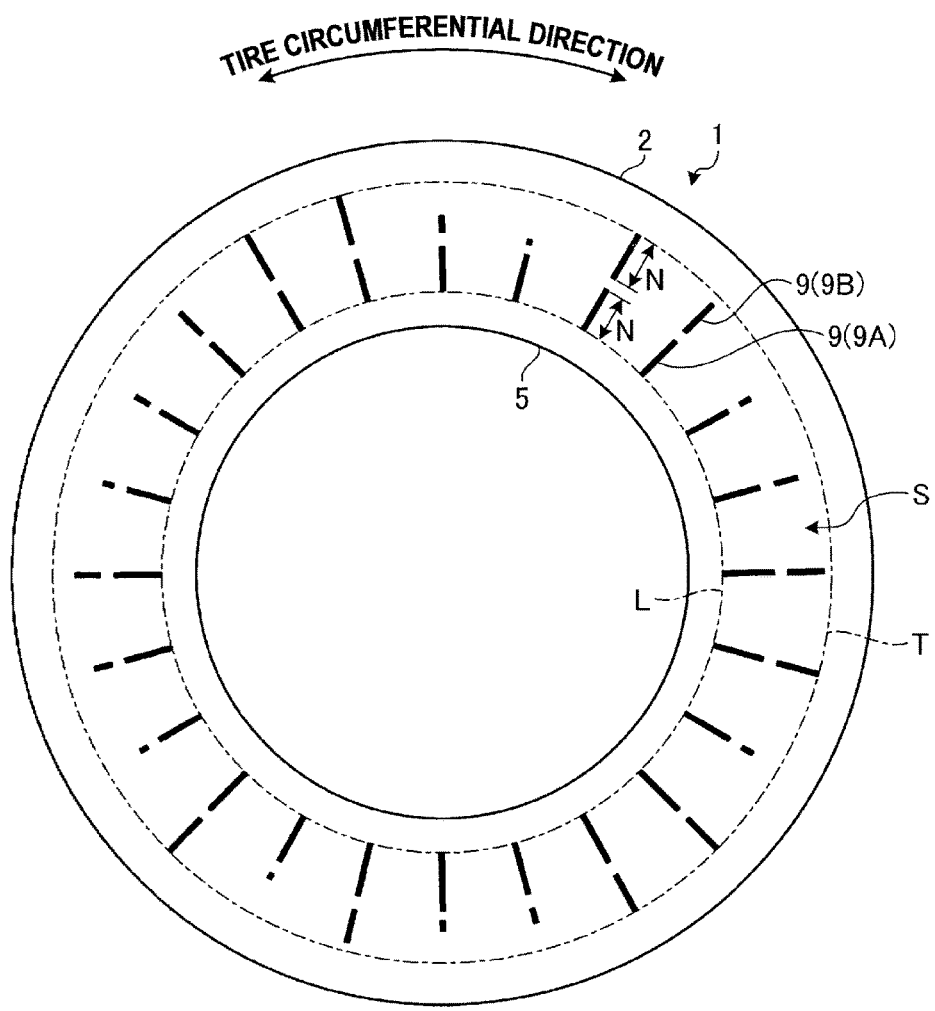
FIG. 17 is an external view of another example of a pneumatic tire according to the second embodiment of the present technology as viewed from the tire width direction.

FIGS. 16 and 17 are external views of other examples of pneumatic tires according to the present embodiment as viewed from the tire width direction.

As illustrated in FIG. 16, a plurality of ridges 9 that project outward from the surface of a tire side section S of the pneumatic tire 1 configured as illustrated in FIG. 1 is provided on the tire side section S.

As illustrated in FIG. 16, the ridges 9 are formed as long projections that extend in the tire radial direction within the tire side section S and are constituted by a rubber material (which may be the rubber material constituting the tire side section S or a different rubber material), and a plurality thereof are disposed at intervals in the tire circumferential direction.

The ridges 9 are formed so that the lateral direction cross-sectional shapes thereof are as illustrated, for example, in FIGS. 3 to 9. The ridge 9 illustrated in FIG. 3 has a cross-sectional shape in the lateral direction that is a rectangular shape. The ridge 9 illustrated in FIG. 4 has a cross-sectional shape in the lateral direction that is a triangular shape. The ridge 9 illustrated in FIG. 5 has a cross-sectional shape in the lateral direction that is a trapezoidal shape. In addition, while not explicitly illustrated in the drawings, the cross-sectional shape in the lateral direction of the ridges 9 may be various shapes such as a triangular shape on the top of rectangular shape, or a zigzag shape on the top of rectangular shape. Also, the cross-sectional shape in the lateral direction of the ridges 9 may have an external form based on curved lines. The ridge 9 illustrated in FIG. 6 has a cross-sectional shape in the lateral direction that is a semi-circular shape. In addition, while not explicitly illustrated in the drawings, the cross-sectional shape in the lateral direction of the ridges 9 may have various shapes such as, for example, a semi-oval shape or a semi-elliptical shape. Also, the cross-sectional shape in the lateral direction of the ridges 9 may have an external form that is a combination of straight lines and curves. The ridge 9 illustrated in FIG. 7 has a cross-sectional shape in the lateral direction that is a rectangular shape whose corners are curved. The ridge 9 illustrated in FIG. 8 has a cross-sectional shape in the lateral direction that is a triangular shape whose corners are curved. In addition, while not illustrated in the drawings, the shape may be various shapes such as a waveform on the top of rectangular shape. Also, as illustrated in FIGS. 7 to 9, the cross-sectional shape in the lateral direction of the ridges 9 may have a shape in which the base portion that projects from the tire side section S is curved. In the present embodiment, the ridges 9 are formed with uniform lengthwise-directional cross-sectional shapes (protruding height H from the tire side section S and lateral-directional width W), and are disposed at equal intervals around the tire circumferential direction (i.e., the angles θ between the ridges 9 in the tire circumferential direction are uniform).

The ridges 9 are non-uniformly disposed in the tire circumferential direction. Specifically, in the pneumatic tire 1 of the present embodiment, the ridges 9 are disposed around the tire circumferential direction at varied lengthwise-directional lengths N.

Variation in the lengths N of the ridges 9 takes the form, for example, of the lengthwise-directional lengths N of adjacent ridges 9 in the tire circumferential direction being different from the lengthwise-directional lengths N of other ridges 9, and the arrangement of these differing lengths N around the tire circumferential direction being non-uniform and non-constant, as illustrated in FIG. 16.

Also possible is an arrangement, not illustrated in the drawings, in which the variation in the lengths N of the ridges 9 takes the form, for example, of a set in which a plurality of adjacent ridges 9 have identical lengths N and a set having identical lengths N in which the lengths N of the ridges 9 are different from those of the first set being non-uniformly disposed and non-constantly around the tire circumferential direction.

If the ridges 9 extend in straight lines in the tire radial direction, as illustrated in FIG. 16, the lengths N of the ridges 9 are expressed by the directions in which the ridges 9 extend. By contrast, if the ridges 9 are oblique with respect to the tire radial direction as illustrated in FIG. 11, bent as illustrated in FIG. 12, curved as illustrated in FIG. 13, meander as illustrated in FIG. 14, or zigzagging (not illustrated in the drawings), the distances between both ends of the ridges 9 as projected in the tire circumferential direction are considered the lengths N of the ridges 9.

The ridges 9 may also be divided along the tire radial direction. In such cases, for example, divided ridges 9A positioned further inward in the tire radial direction are disposed around the tire circumferential direction with uniform lengthwise-directional lengths N, and divided ridges 9B positioned further outward in the tire radial direction are disposed around the tire circumferential direction with varied lengthwise-directional lengths N, as illustrated in FIG. 17. Also possible is an arrangement, not illustrated in the drawings, in which divided ridges 9A positioned further inward in the tire radial direction are disposed around the tire circumferential direction with varied lengthwise-directional lengths N, and divided ridges 9B positioned further outward in the tire radial direction are disposed around the tire circumferential direction with uniform lengthwise-directional lengths N. Also possible is an arrangement, not illustrated in the drawings, in which divided ridges 9A positioned further inward in the tire radial direction and ridges 9B positioned further outward in the tire radial direction are disposed around the tire circumferential direction with varied lengthwise-directional lengths N. Apart from the embodiment illustrated in FIG. 17, the ridges may be divided into three sections in the tire radial direction in arrangements in which the ridges 9 are divided. The ridges 9 may also be formed overlapping each other in the tire circumferential direction in arrangements featuring divided ridges.

In this way, the pneumatic tire 1 according to the present embodiment is a pneumatic tire 1 having a plurality of long radially extending ridges 9 disposed at intervals in the tire circumferential direction on at least one tire side section S, wherein the ridges 9 are non-uniformly disposed around the tire circumferential direction.

In accordance with the pneumatic tire 1 according to the present embodiment, an air distribution promotion effect and streamlining effect is yielded at the tire side section S by the ridges 9 provided on the tire side section S, thereby maintaining air resistance reduction effects for the vehicle on which the pneumatic tire 1 is mounted, and allowing for improved vehicle fuel economy. Moreover, in accordance with the pneumatic tire 1 according to the present embodiment, the ridges 9 are non-uniformly disposed around the tire circumferential direction, thereby dispersing noise over a wide range of frequencies that can be produced when air strikes or rushes over the ridges 9 and allowing for reduced vehicle interior noise.

In addition, in the pneumatic tire 1 of the present embodiment, the ridges 9 are disposed around the tire circumferential direction at varied lengthwise-directional lengths N.

In accordance with the pneumatic tire 1 according to the present embodiment, an arrangement in which the ridges 9 are non-uniformly disposed around the tire circumferential direction can be realized, thereby maintaining vehicle air resistance reduction effects and allowing vehicle interior noise reduction effects to be obtained. It is also possible to divide the ridges 9 in the tire radial direction and dispose the ridges 9 with varied lengthwise-directional lengths in the tire circumferential direction; this allows for an arrangement in which the ridges 9 are non-uniformly disposed around the tire circumferential direction, thereby maintaining vehicle air resistance reduction effects and allowing vehicle interior noise reduction effects to be obtained.

In addition, in the pneumatic tire 1 according to the present embodiment, the lengths N of the ridges 9 vary within a range of 10% to 90% with respect to the dimension h of the tire side section S in the tire radial direction (see FIG. 1).

In accordance with the pneumatic tire 1 according to the present embodiment, the lengthwise-directional lengths N of the ridges 9 are varied within the range described above, thereby allowing marked vehicle interior noise reduction effects to be obtained.

Third Embodiment

Figure 18:
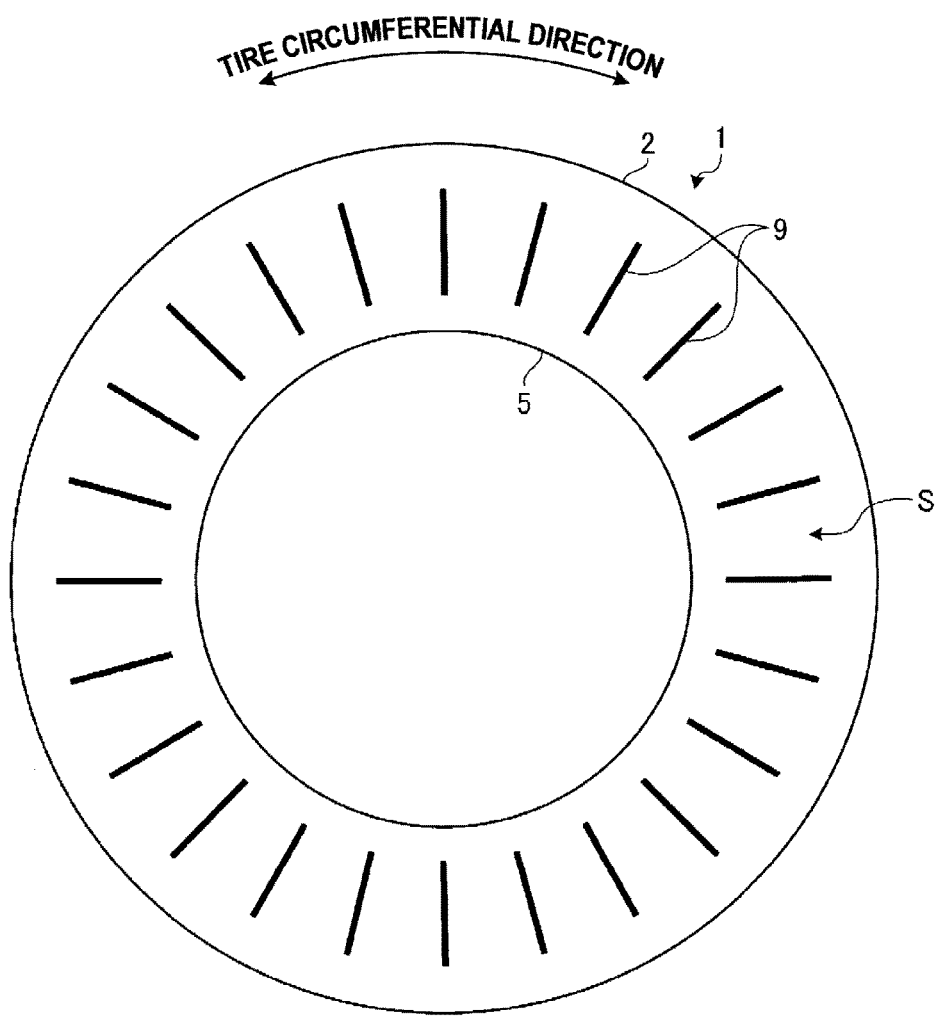
FIG. 18 is an external view of another example of a pneumatic tire according to a third embodiment of the present technology as viewed from the tire width direction.
Figure 19:
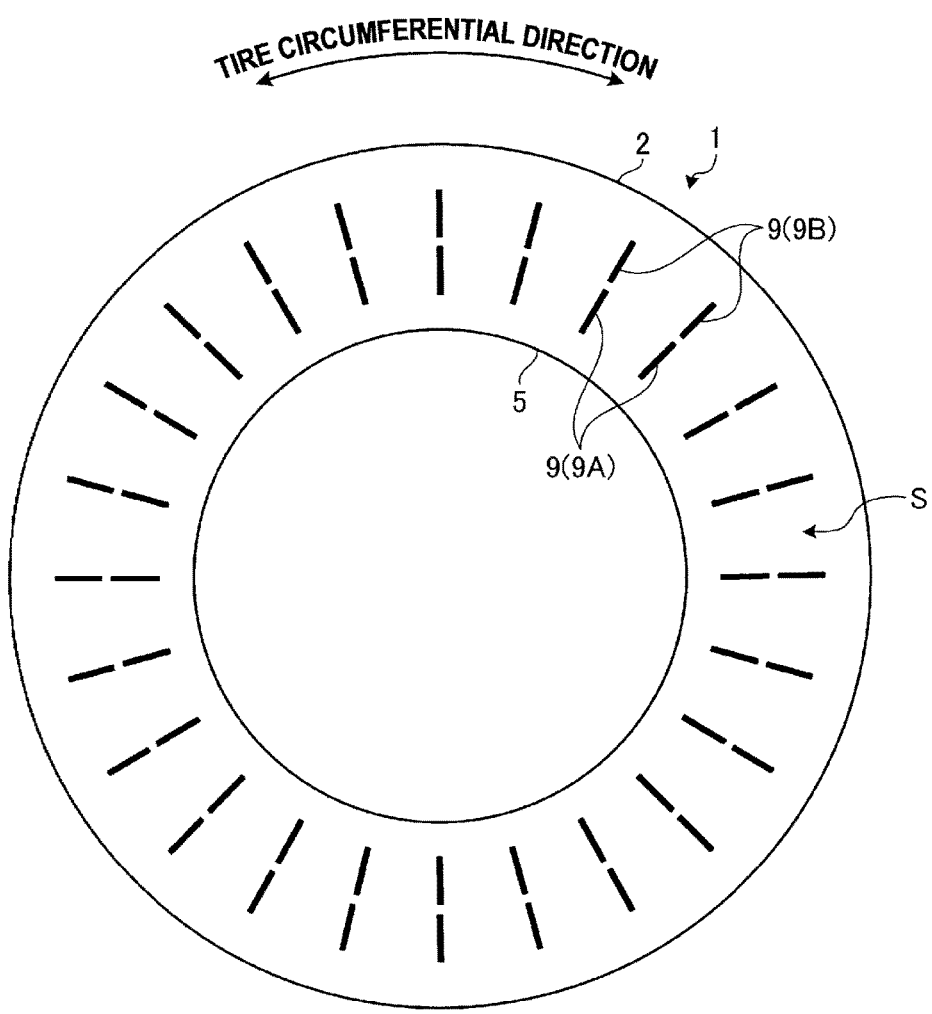
FIG. 19 is an external view of another example of a pneumatic tire according to the third embodiment of the present technology as viewed from the tire width direction.

FIGS. 18 and 19 are external views of other examples of pneumatic tires according to the present embodiment as viewed from the tire width direction.

As illustrated in FIG. 18, a plurality of ridges 9 that project outward from the surface of a tire side section S of the pneumatic tire 1 configured as illustrated in FIG. 1 is provided on the tire side section S.

As illustrated in FIG. 18, the ridges 9 are formed as long projections that extend in the tire radial direction within the tire side section S and are constituted by a rubber material (which may be the rubber material constituting the tire side section S or a different rubber material), and a plurality thereof are disposed at intervals in the tire circumferential direction.

The ridges 9 are formed so that the lateral direction cross-sectional shapes thereof are as illustrated, for example, in FIGS. 3 to 9. The ridge 9 illustrated in FIG. 3 has a cross-sectional shape in the lateral direction that is a rectangular shape. The ridge 9 illustrated in FIG. 4 has a cross-sectional shape in the lateral direction that is a triangular shape. The ridge 9 illustrated in FIG. 5 has a cross-sectional shape in the lateral direction that is a trapezoidal shape. In addition, while not explicitly illustrated in the drawings, the cross-sectional shape in the lateral direction of the ridges 9 may be various shapes such as a triangular shape on the top of rectangular shape, or a zigzag shape on the top of rectangular shape. Also, the cross-sectional shape in the lateral direction of the ridges 9 may have an external form based on curved lines. The ridge 9 illustrated in FIG. 6 has a cross-sectional shape in the lateral direction that is a semi-circular shape. In addition, while not explicitly illustrated in the drawings, the cross-sectional shape in the lateral direction of the ridges 9 may have various shapes such as, for example, a semi-oval shape or a semi-elliptical shape. Also, the cross-sectional shape in the lateral direction of the ridges 9 may have an external form that is a combination of straight lines and curves. The ridge 9 illustrated in FIG. 7 has a cross-sectional shape in the lateral direction that is a rectangular shape whose corners are curved. The ridge 9 illustrated in FIG. 8 has a cross-sectional shape in the lateral direction that is a triangular shape whose corners are curved. In addition, while not illustrated in the drawings, the shape may be various shapes such as a waveform on the top of rectangular shape. Also, as illustrated in FIGS. 7 to 9, the cross-sectional shape in the lateral direction of the ridges 9 may have a shape in which the base portion that projects from the tire side section S is curved. In the present embodiment, the ridges 9 are formed with uniform lengthwise-directional lengths N and lateral-directional widths W, and are disposed at equal intervals around the tire circumferential direction (i.e., the angles θ between the ridges 9 in the tire circumferential direction are uniform).

The ridges 9 are non-uniformly disposed in the tire circumferential direction. Specifically, in the pneumatic tire 1 according to the present embodiment, the ridges 9 are disposed at varied heights H of projection from the tire side section S (see FIGS. 3 to 9).

Variation in the heights H of the ridges 9 takes the form, for example, of adjacent ridges 9 in the tire circumferential direction having different heights H, and the arrangement of ridges 9 of different heights H being non-uniformly disposed and non-constantly around the tire circumferential direction.

Also possible is an arrangement in which the variation in the heights H of the ridges 9 takes the form, for example, of a set in which a plurality of adjacent ridges 9 in the tire circumferential direction have identical heights H and a set having identical heights H in which the heights H of the ridges 9 are different from those of the first set being non-uniformly disposed and non-constantly around the tire circumferential direction.

The ridges 9 may also be divided along the tire radial direction. In such cases, for example, divided ridges 9A positioned further inward in the tire radial direction are disposed around the tire circumferential direction with uniform heights H, and divided ridges 9B positioned further outward in the tire radial direction are disposed around the tire circumferential direction with varied heights H, as illustrated in FIG. 19. Also possible is an arrangement in which divided ridges 9A positioned further inward in the tire radial direction are disposed around the tire circumferential direction with varied heights H, and divided ridges 9B positioned further outward in the tire radial direction are disposed around the tire circumferential direction with uniform heights H. Also possible is an arrangement in which divided ridges 9A positioned further inward in the tire radial direction and ridges 9B positioned further outward in the tire radial direction are disposed around the tire circumferential direction with varied heights H. Apart from the embodiment illustrated in FIG. 19, the ridges may be divided into three sections in the tire radial direction in arrangements in which the ridges 9 are divided. The ridges 9 may also be formed overlapping each other in the tire circumferential direction in arrangements featuring divided ridges.

In this way, the pneumatic tire 1 according to the present embodiment is a pneumatic tire 1 having a plurality of long radially extending ridges 9 disposed at intervals in the tire circumferential direction on at least one tire side section S, wherein the ridges 9 are non-uniformly disposed around the tire circumferential direction.

In accordance with the pneumatic tire 1 according to the present embodiment, an air distribution promotion effect and streamlining effect is yielded at the tire side section S by the ridges 9 provided on the tire side section S, thereby maintaining air resistance reduction effects for the vehicle on which the pneumatic tire 1 is mounted, and allowing for improved vehicle fuel economy. Moreover, in accordance with the pneumatic tire 1 according to the present embodiment, the ridges 9 are non-uniformly disposed around the tire circumferential direction, thereby dispersing noise over a wide range of frequencies that can be produced when air strikes or rushes over the ridges 9 and allowing for reduced vehicle interior noise.

In addition, in the pneumatic tire 1 according to the present embodiment, the ridges 9 are disposed around the tire circumferential direction at varied heights H of projection from the tire side section S.

In accordance with the pneumatic tire 1 according to the present embodiment, an arrangement in which the ridges 9 are non-uniformly disposed around the tire circumferential direction can be created, thereby maintaining vehicle air resistance reduction effects and allowing vehicle interior noise reduction effects to be obtained. It is also possible to divide the ridges 9 in the tire radial direction and dispose the ridges 9 with varied heights H in the tire circumferential direction; this allows for an arrangement in which the ridges 9 are non-uniformly disposed around the tire circumferential direction, thereby maintaining vehicle air resistance reduction effects and allowing vehicle interior noise reduction effects to be obtained.

In addition, in the pneumatic tire 1 according to the present embodiment, the heights H of the ridges 9 disposed with varied heights H vary in a range of 1 mm to 10 mm.

In accordance with the pneumatic tire 1 according to the present embodiment, the heights H of the ridges 9 are varied within the range described above, thereby allowing marked vehicle interior noise reduction effects to be obtained. It is preferable for the heights H at which the ridges 9 project from the tire side section S to be in a range of 1 mm to 10 mm in order to obtain more pronounced air distribution promotion effects and streamlining effects.

Fourth Embodiment

Figure 20:
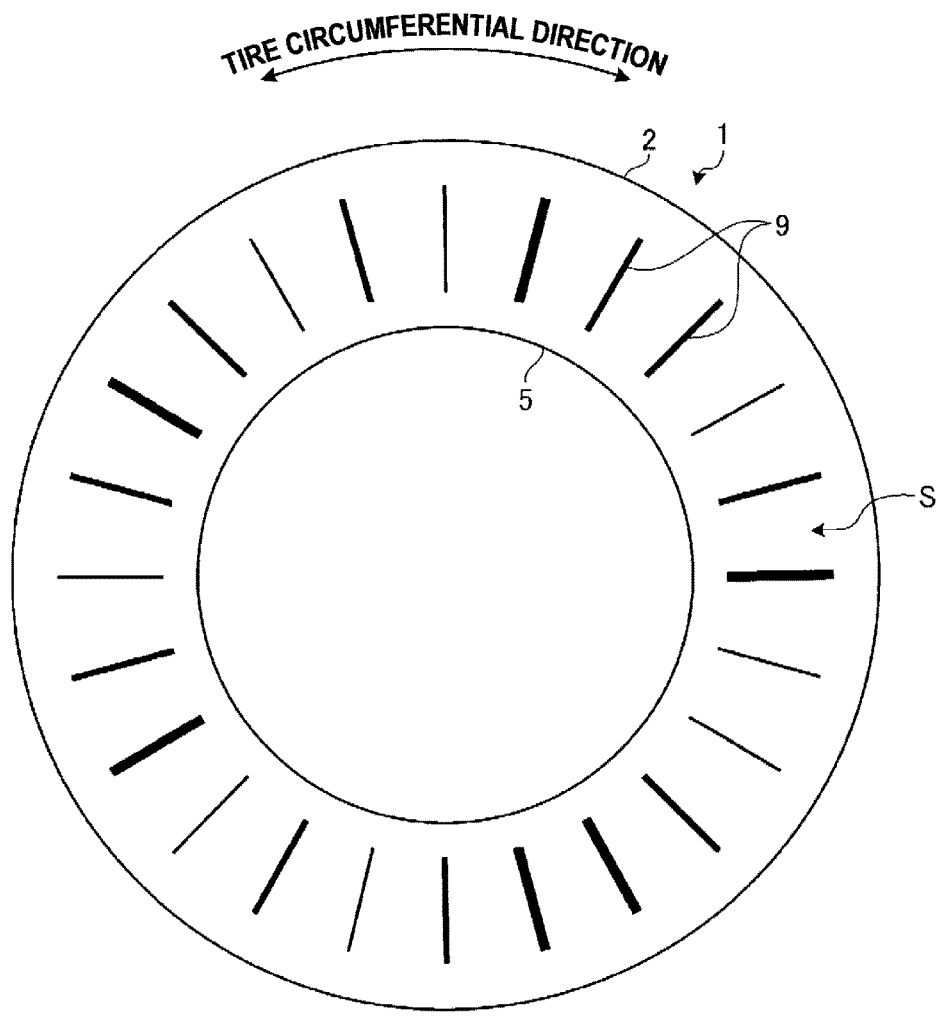
FIG. 20 is an external view of another example of a pneumatic tire according to a fourth embodiment of the present technology as viewed from the tire width direction.
Figure 21:
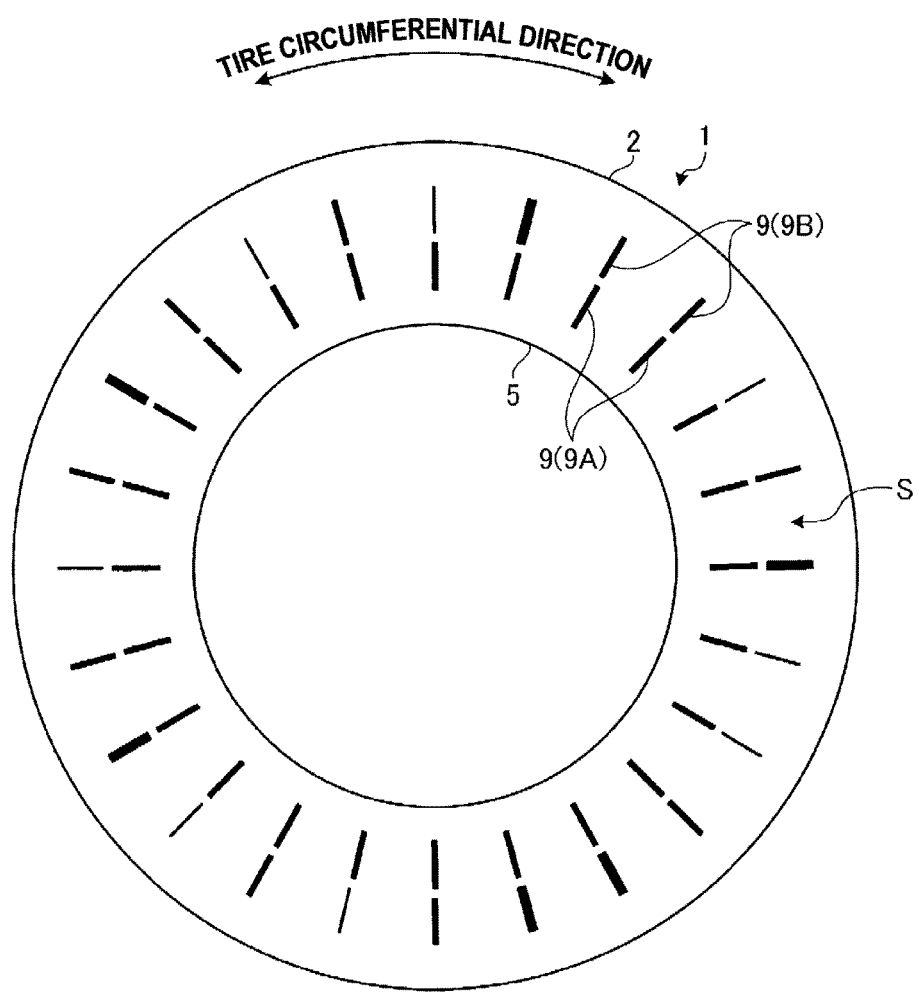
FIG. 21 is an external view of another example of a pneumatic tire according to the fourth embodiment of the present technology as viewed from the tire width direction.

FIGS. 20 and 21 are external views of other examples of pneumatic tires according to the present embodiment as viewed from the tire width direction.

As illustrated in FIG. 20, a plurality of ridges 9 that project outward from the surface of a tire side section S of the pneumatic tire 1 configured as illustrated in FIG. 1 is provided on the tire side section S.

As illustrated in FIG. 20, the ridges 9 are formed as long projections that extend in the tire radial direction within the tire side section S and are constituted by a rubber material (which may be the rubber material constituting the tire side section S or a different rubber material), and a plurality thereof are disposed at intervals in the tire circumferential direction.

The lateral direction cross-sectional shapes of the ridges 9 are formed, for example, as illustrated in FIGS. 3 to 9. The ridge 9 illustrated in FIG. 3 has a cross-sectional shape in the lateral direction that is a rectangular shape. The ridge 9 illustrated in FIG. 4 has a cross-sectional shape in the lateral direction that is a triangular shape. The ridge 9 illustrated in FIG. 5 has a cross-sectional shape in the lateral direction that is a trapezoidal shape. In addition, while not explicitly illustrated in the drawings, the cross-sectional shape in the lateral direction of the ridges 9 may be various shapes such as a triangular shape on the top of rectangular shape, or a zigzag shape on the top of rectangular shape. Also, the cross-sectional shape in the lateral direction of the ridges 9 may have an external form based on curved lines. The ridge 9 illustrated in FIG. 6 has a cross-sectional shape in the lateral direction that is a semi-circular shape. In addition, while not explicitly illustrated in the drawings, the cross-sectional shape in the lateral direction of the ridges 9 may have various shapes such as, for example, a semi-oval shape or a semi-elliptical shape. Also, the cross-sectional shape in the lateral direction of the ridges 9 may have an external form that is a combination of straight lines and curves. The ridge 9 illustrated in FIG. 7 has a cross-sectional shape in the lateral direction that is a rectangular shape whose corners are curved. The ridge 9 illustrated in FIG. 8 has a cross-sectional shape in the lateral direction that is a triangular shape whose corners are curved. In addition, while not illustrated in the drawings, the shape may be various shapes such as a waveform on the top of rectangular shape. Also, as illustrated in FIGS. 7 to 9, the cross-sectional shape in the lateral direction of the ridges 9 may have a shape in which the base portion that projects from the tire side section S is curved. In the present embodiment, the ridges 9 are formed at uniform lengthwise-directional lengths N and protruding heights H, and are disposed at equal intervals in the tire circumferential direction (i.e., the angles θ between the ridges 9 in the tire circumferential direction are uniform).

The ridges 9 are non-uniformly disposed in the tire circumferential direction. Specifically, in the pneumatic tire 1 according to the present embodiment, the ridges 9 are disposed at varied lateral-directional widths W (see FIGS. 3 to 9).

Variation in the widths W of the ridges 9 takes the form, for example, of adjacent ridges 9 in the tire circumferential direction having different widths W, and the arrangement of ridges 9 of different widths W being non-uniformly disposed and non-constantly around the tire circumferential direction.

Also possible is an arrangement in which the variation in the widths W of the ridges 9 takes the form, for example, of a set in which a plurality of adjacent ridges 9 in the tire circumferential direction have identical widths W and a set having identical widths W in which the widths W of the ridges 9 are different from those of the first set are non-uniformly disposed and non-constantly around the tire circumferential direction.

The ridges 9 may also be divided along the tire radial direction. In such cases, for example, divided ridges 9A positioned further inward in the tire radial direction are disposed around the tire circumferential direction with uniform widths W, and divided ridges 9B positioned further outward in the tire radial direction are disposed around the tire circumferential direction with varied widths W, as illustrated in FIG. 21. Also possible is an arrangement, not illustrated in the drawings, in which divided ridges 9A positioned further inward in the tire radial direction are disposed around the tire circumferential direction with varied widths W, and divided ridges 9B positioned further outward in the tire radial direction are disposed around the tire circumferential direction with uniform widths W. Also possible is an arrangement, not illustrated in the drawings, in which divided ridges 9A positioned further inward in the tire radial direction and ridges 9B positioned further outward in the tire radial direction are disposed around the tire circumferential direction with varied widths W. Apart from the embodiment illustrated in FIG. 21, the ridges may be divided into three sections in the tire radial direction in arrangements in which the ridges 9 are divided. The ridges 9 may also be formed overlapping each other in the tire circumferential direction in arrangements featuring divided ridges.

In this way, the pneumatic tire 1 according to the present embodiment is a pneumatic tire 1 having a plurality of long radially extending ridges 9 disposed at intervals in the tire circumferential direction on at least one tire side section S, wherein the ridges 9 are non-uniformly disposed around the tire circumferential direction.

In accordance with the pneumatic tire 1 according to the present embodiment, an air distribution promotion effect and streamlining effect is yielded at the tire side section S by the ridges 9 provided on the tire side section S, thereby maintaining air resistance reduction effects for the vehicle on which the pneumatic tire 1 is mounted, and allowing for improved vehicle fuel economy. Moreover, in accordance with the pneumatic tire 1 according to the present embodiment, the ridges 9 are non-uniformly disposed around the tire circumferential direction, thereby dispersing noise over a wide range of frequencies that can be produced when air strikes or rushes over the ridges 9 and allowing for reduced vehicle interior noise.

In addition, in the pneumatic tire 1 of the present embodiment, the ridges 9 are disposed around the tire circumferential direction at varied lateral-directional widths W.

In accordance with the pneumatic tire 1 according to the present embodiment, an arrangement in which the ridges 9 are non-uniformly disposed around the tire circumferential direction can be created, thereby maintaining vehicle air resistance reduction effects and allowing vehicle interior noise reduction effects to be obtained. It is also possible to divide the ridges 9 in the tire radial direction and dispose the ridges 9 with varied widths W in the tire circumferential direction; this allows for an arrangement in which the ridges 9 are non-uniformly disposed around the tire circumferential direction, thereby maintaining vehicle air resistance reduction effects and allowing vehicle interior noise reduction effects to be obtained.

In addition, in the pneumatic tire 1 according to the present embodiment, the widths W of the ridges 9 disposed with varied widths W vary in a range of 0.5 mm to 5 mm.

In accordance with the pneumatic tire 1 according to the present embodiment, the widths W of the ridges 9 are varied within the range described above, thereby allowing marked vehicle interior noise reduction effects to be obtained. It is preferable for the widths W of the ridges 9 to be within a range of 0.5 mm to 5 mm in order to obtain more pronounced air distribution promotion effects and streamlining effects.

Fifth Embodiment

Figure 22:
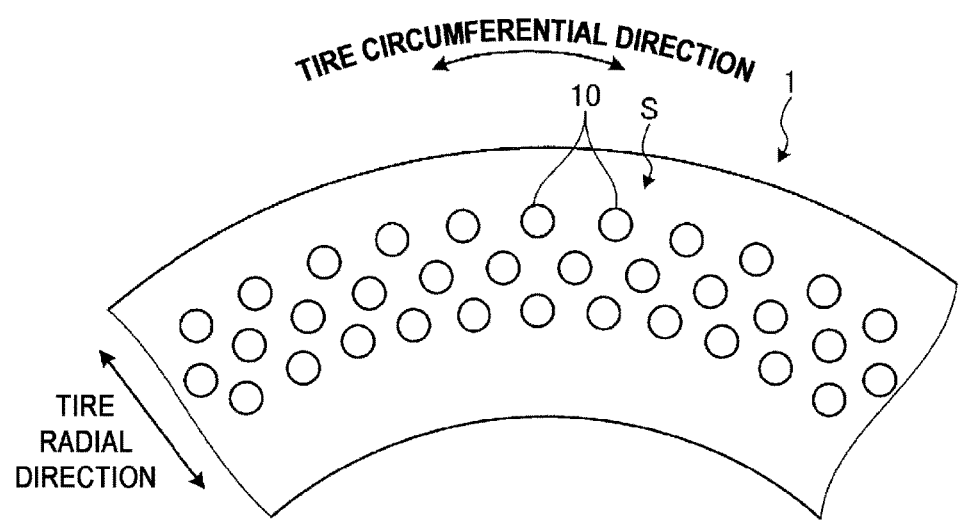
FIG. 22 is a partial external view of a pneumatic tire according to a fifth embodiment of the present technology as viewed from outside a vehicle.

In the pneumatic tire 1 according to the present embodiment, it is preferable that the ridges 9 be disposed on one tire side section S, and a plurality of recesses 10 be disposed on another tire side section S, as illustrated in the partial external view of a pneumatic tire according to the present embodiment as viewed from an outer side of the vehicle illustrated in FIG. 22.

As illustrated in FIG. 22, the recesses 10 are disposed, for example, in a region of the tire side section S at predetermined intervals in the tire radial direction and the tire circumferential direction.

The recesses 10 have an aperture shape that is open on the surface of the tire side section S, and are formed in a circular shape, an elliptical shape, an oval shape, a polygonal shape, or the like. Also, the recesses 10 are formed so that the cross-sectional shape is a semi-circular shape, a semi-oval shape or a semi-elliptical shape, a mortar shape, a rectangular shape, or the like. In FIG. 22, the recesses 10 are disposed in a staggered manner in the tire radial direction and the tire circumferential direction, but they may be disposed in a line in the tire radial direction, or disposed in a line in the tire circumferential direction.

For example, the orientation with respect to the inside and outside of the vehicle when mounted on a vehicle is designated, and the ridges 9 as described above are provided on the tire side section S facing the outside of the vehicle, and the recesses 10 as described above are provided on the tire side section S facing the inside of the vehicle.

The designation of orientation with respect to the vehicle inner side and the vehicle outer side is, for example, indicated by an indicator provided on the side wall section 4 (not explicitly illustrated in the drawings). Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the vehicle inner side and the vehicle outer side in the tire width direction is designated.

Figure 23:
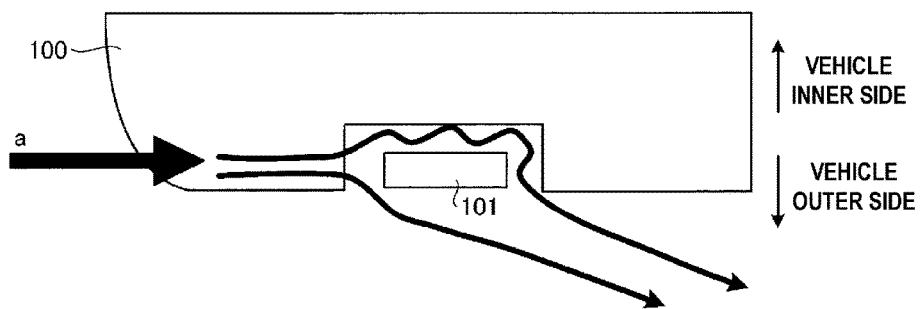
FIG. 23 is an explanatory drawing illustrating the flow of air around a typical pneumatic tire.

In this case, as illustrated in FIG. 23 which illustrates the flow of air in the vicinity of a normal pneumatic tire, a flow of air is produced in the direction of the arrow a in the drawings from the front to the rear of a vehicle around a pneumatic tire 101 not having the ridges 9 and the recesses 10 due to driving the vehicle 100. The flow of air a passes between the pneumatic tire 101 and the vehicle 100 on the vehicle inner side of the pneumatic tire 101 and exits spreading on the vehicle outer side. Also, on the vehicle outer side of the pneumatic tire 101, the air flow passes while spreading to the vehicle outer side. These air flows cause vehicle resistance.

Figure 24:
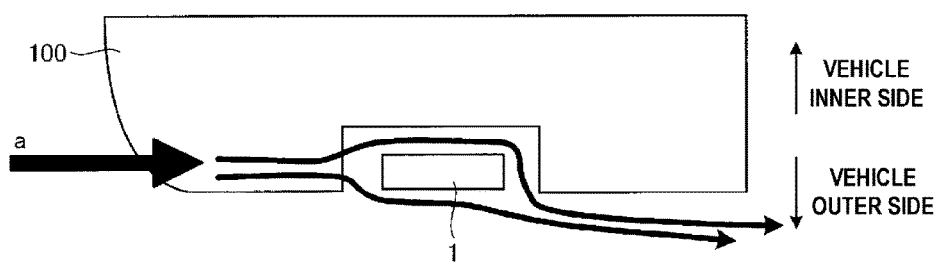
FIG. 24 is an explanatory drawing illustrating the flow of air around the pneumatic tire according to the fifth embodiment of the present technology.

In contrast, by providing the ridges 9 as described above on the vehicle outer side and providing the recesses 10 as described above on the vehicle inner side of the pneumatic tire 1, as illustrated in FIG. 24 which illustrates the flow of air in the vicinity of the pneumatic tire according to the present embodiment, the flow of air a from the front side to the rear side of the vehicle on the vehicle inner side of the pneumatic tire 1 passes between the pneumatic tire 1 and the vehicle 100, and the air is made turbulent due to the recesses 10. Also, on the vehicle outer side of the pneumatic tire 1, the air that passes the vehicle outer side is made turbulent by the ridges 9. Therefore, a turbulent flow boundary layer is generated on the periphery of the pneumatic tire 1, so on the vehicle inner side, expansion of air that escapes the vehicle outer side to the rear of the vehicle is suppressed, and, on the vehicle outer side, expansion of the air passing the vehicle outer side of the pneumatic tire 1 is suppressed. As a result, the spread of the passing air is suppressed, so the air resistance of the vehicle is reduced, and the fuel economy can be further improved.

Also, preferably, the pneumatic tire 1 according to the present embodiment has a designated orientation with respect to the inside and outside of the vehicle when mounted thereupon, and the ridges 9 are disposed on the tire side section S facing the inside of the vehicle.

In the pneumatic tire 1 provided with the ridges 9 on the vehicle inner side as described above, the flow of air a (see FIG. 24) from the front side to the rear side of the vehicle 100 is promoted and streamlined by the ridges 9 on the vehicle inner side of the pneumatic tire 1. Therefore, turbulence of the air flow passing the vehicle inner side of the pneumatic tire 1 is suppressed. As a result, the spread of the passing air is suppressed, so the air resistance of the vehicle is reduced, and the fuel economy can be further improved.

If the tire has a designated orientation with respect to the inside and outside of the vehicle when mounted thereupon and ridges 9 are disposed on the tire side section S facing the inside of the vehicle, it is more preferable that recesses 10 be disposed on the tire side section S facing the outside of the vehicle.

In this case, the flow of air a (see FIG. 24) from the front side to the rear side of the vehicle 100 is promoted and streamlined by the ridges 9 on the vehicle inner side of the pneumatic tire 1. Therefore, turbulence of the air flow passing the vehicle inner side of the pneumatic tire 1 is suppressed. On the other hand, the flow of air a (see FIG. 24) from the front side to the rear side of the vehicle 100 is made turbulent by the recesses 10 on the vehicle outer side of the pneumatic tire 1, so a turbulent flow boundary layer is generated around the periphery of the pneumatic tire 1, and separation from the pneumatic tire 1 is suppressed. Therefore, spreading of the air flow passing the vehicle outer side of the pneumatic tire 1 is suppressed. As a result, the spread of the passing air is suppressed, so the air resistance of the vehicle 100 is further reduced, and it is possible to further improve the fuel economy.

Preferably, the diameter dimension of the opening portion of the recesses 10 satisfies the range of not less than 0.5 mm and not more than 10 mm, and the depth satisfies the range of not less than 0.3 mm and not more than 2 mm.

If the diameter dimension of the opening portion of the recesses 10 is not less than 0.5 mm and the depth is not less than 0.3 mm, sufficient turbulent flow generation effect can be obtained. On the other hand, if the diameter dimension of the opening portion of the recesses 10 is not more than 10 mm and the depth is not more than 2 mm, it is possible to obtain a turbulent flow generation effect without increasing the air resistance.

In the various embodiments described above, an embodiment in which the ridges 9 are disposed in the tire circumferential direction with varied angles θ between the ridges 9, an embodiment in which the ridges 9 are disposed in the tire circumferential direction with varied lengthwise-directional lengths N, an embodiment in which the ridges 9 are disposed in the tire circumferential direction with varied heights H of projection from the tire side section S, and an embodiment in which the ridges 9 are disposed in the tire circumferential direction with varied lateral-directional widths W have been described as embodiments in which the ridges 9 are non-uniformly disposed in the tire circumferential direction.

These various embodiments may be applied individually or in combinations of two or more.

Working Examples

In the following examples, multiple types of pneumatic tires of different conditions were subjected to performance tests of fuel economy improvement rate and noise level improvement rate (see FIGS. 25 to 28).

In the performance test for fuel economy improvement rate, a pneumatic tire having a tire size of 195/65R15 was mounted on a regular rim and inflated to a regular inner pressure, then mounted on a compact front-wheel drive vehicle having an engine displacement of 1,500 cc+motor assist drive. The method of evaluating the fuel economy improvement rate was to measure the fuel economy for a case where the test vehicle described above was driven 50 laps on a 2 km (total length) test course at a speed of 100 km/h. Based on the measurement results, the fuel economy improvement rates were indexed with the index score of the pneumatic tire of the Conventional Example (100) being a reference. In this evaluation, larger index scores indicate enhanced fuel economy improvement rates.

In the performance test for noise level improvement rate, a pneumatic tire having a tire size of 195/65R15 was mounted on a regular rim and inflated to a regular inner pressure, then mounted on a compact front-wheel drive vehicle having an engine displacement of 1,500 cc+motor assist drive. The method of evaluating the noise level improvement rate was to measure vehicle interior noise in a frequency range of 500 Hz to 2,000 Hz when the test vehicle described above was driven at a speed of 100 km/h on a test course. Based on the measurement results, the fuel economy improvement rates were indexed against the index score (100) of the pneumatic tire of the Conventional Example. In the present index evaluation, larger values indicated enhanced noise level improvement rates.

In FIGS. 25 to 28, a Conventional Example of a pneumatic tire has a plurality of long radially extending ridges disposed at intervals in a tire circumferential direction on a tire side section on a side thereof facing outward when mounted on a vehicle. Specifically, the ridges extend in the tire radial direction in the center of the tire side section, with the number thereof in the tire circumferential direction being 24, the length thereof being 50 mm, the height thereof being 6 mm, and the width thereof being 3 mm.

Meanwhile, in FIG. 25, pneumatic tires according to Working Examples 1 to 10 have ridges that are non-uniformly disposed in the tire circumferential direction, with the angles between the ridges varying around the tire circumferential direction. Specifically, the ridges extend in the tire radial direction in the center of the tire side section, with the length thereof being 50 mm, the number thereof in the tire circumferential direction being 24, the height thereof being 6 mm, and the width thereof being 3 mm. In the pneumatic tires according to Working Examples 3 to 10, the angle ratio indicating the variation in angles is set to a defined value. In the pneumatic tires according to Working Examples 7 and 10, ridges are disposed on one tire side section, and recesses are disposed on another tire side section. The ridges were disposed on the vehicle inner side on the pneumatic tires according to Working Example 8 and Working Example 10. Ridges were disposed on both sides of the vehicle on the pneumatic tires according to Working Example 9.

In FIG. 26, pneumatic tires according to Working Examples 11 to 19 have ridges that are non-uniformly disposed in the tire circumferential direction, with the ridges having varied lengths around the tire circumferential direction. Specifically, the ridges extend in the tire radial direction in the center of the tire side section, with the number thereof in the tire circumferential direction being 24, the height thereof being 6 mm, and the width thereof being 3 mm. In the pneumatic tires according to Working Examples 13 to 19, the range of variation in length with respect to the tire side section is set to a defined value. In the pneumatic tires according to Working Examples 16 and 19, ridges are disposed on one tire side section, and recesses are disposed on another tire side section. The ridges were disposed on the vehicle inner side on the pneumatic tires according to Working Example 17 and Working Example 19. Ridges were disposed on both sides of the vehicle on the pneumatic tires according to Working Example 10.

In FIG. 27, pneumatic tires according to Working Examples 20 to 28 have ridges that are non-uniformly disposed in the tire circumferential direction, with the ridges having varied heights around the tire circumferential direction. Specifically, the ridges extend in the tire radial direction in the center of the tire side section, with the length thereof being 50 mm, the number thereof in the tire circumferential direction being 24, and the width thereof being 3 mm. In the pneumatic tires according to Working Examples 22 to 28, the range of variation in height is set to a defined value. In the pneumatic tires according to Working Examples 25 and 28, ridges are disposed on one tire side section, and recesses are disposed on another tire side section. The ridges were disposed on the vehicle inner side on the pneumatic tires according to Working Example 26 and Working Example 28. Ridges were disposed on both sides of the vehicle on the pneumatic tires according to Working Example 27.

In FIG. 28, pneumatic tires according to Working Examples 29 to 37 have ridges that are non-uniformly disposed in the tire circumferential direction, with the ridges having varied widths around the tire circumferential direction. Specifically, the ridges extend in the tire radial direction in the center of the tire side section, with the length thereof being 50 mm, the number thereof in the tire circumferential direction being 24, and the height thereof being 6 mm. In the pneumatic tires according to Working Examples 31 to 37, the range of variation in width is set to a defined value. In the pneumatic tires according to Working Examples 34 and 37, ridges are disposed on one tire side section, and recesses are disposed on another tire side section. The ridges were disposed on the vehicle inner side on the pneumatic tires according to Working Example 35 and Working Example 37. Ridges were disposed on both sides of the vehicle on the pneumatic tires according to Working Example 36.

From the test results illustrated in FIGS. 25 to 28, it can be seen that air resistance reduction effects are maintained, fuel economy improvement rate is maintained, and vehicle interior noise is improved for the pneumatic tires according to Working Example 1 to Working Example 37.

The invention claimed is:
1. A pneumatic tire comprising:
a plurality of long radially extending ridges disposed at intervals in a tire circumferential direction and a tire radial direction on at least one tire side section; wherein
an inner row of the ridges overlap each other in projection view in the tire circumferential direction;
an outer row of the ridges overlap each other in projection view in the tire circumferential direction and are disposed on an outer side of the inner row of the ridges in the tire radial direction;

the inner row of the ridges and the outer row of the ridges do not overlap each other in projection view in the tire circumferential direction;
a sum of a lengthwise-directional length of one of the inner ridges and a lengthwise-directional length of one of the outer ridges is 40% or greater and 90% or less of dimensions of the tire side section with respect to the tire radial direction;
heights of the ridges from a surface of the tire side section are 6 mm or greater and 10 mm or less;
lateral-directional widths of the ridges are 3 mm or greater and 5 mm or less;
angles are defined as angles between adjacent lines, each line connecting a rotational axis of the tire with a center of a reference line connecting both ends of a ridge in the tire radial direction;
at least one of the inner row and the outer row of the ridges satisfy that the angles between adjacent ridges are non-uniformly disposed around the tire circumferential direction and are irregularly disposed around the tire circumferential direction; three or more of the angles between the adjacent ridges are varied around the tire circumferential direction; a ratio of the angles between the adjacent ridges is 0.95 or less and 1.05 or greater; and three of the angles with a same value are not continuously arranged; and
the angles between the adjacent ridges of at least one of the inner row or the outer row of the ridges are not varied in the tire circumferential direction.

2. The pneumatic tire according to claim 1, wherein the ridges are disposed on one tire side section, and a plurality of recesses is disposed on another tire side section.

3. The pneumatic tire according to claim 1, wherein the tire has a designated orientation with respect to an inside and outside of a vehicle upon being mounted thereupon, and the ridges are disposed on a tire side section facing the inside of the vehicle.

4. A pneumatic tire comprising:
a plurality of long radially extending ridges disposed at intervals in a tire circumferential direction on at least one tire side section; wherein
a single row formed by the ridges;
the ridges of the single row overlap each other in projection view in the tire circumferential direction and which do not overlap each other in a tire radial direction;
lengthwise-directional lengths of the ridges are varied within a range of 40% to 90% of dimensions of the tire side section in the tire radial direction;
the lengthwise-directional lengths are defined as distances between both ends of the ridges as projected in the tire circumferential direction;
heights of the ridges from a surface of the tire side section are 6 mm or greater and 10 mm or less;
lateral-directional widths of the ridges are 3 mm or greater and 5 mm or less;
the lengthwise-directional lengths of the ridges are non-uniformly disposed around the tire circumferential direction and are irregularly disposed around the tire circumferential direction;
three or more of the lengthwise-directional lengths of the ridges are varied around the tire circumferential direction; and
three of the lengthwise-directional lengths with a same value are not continuously arranged.

5. The pneumatic tire according to claim 4, wherein the ridges are disposed on one tire side section, and a plurality of recesses is disposed on another tire side section.

6. The pneumatic tire according to claim 4, wherein the tire has a designated orientation with respect to an inside and outside of a vehicle upon being mounted thereupon, and the ridges are disposed on a tire side section facing the inside of the vehicle.

7. The pneumatic tire according to claim 4, wherein angles are defined as angles between adjacent lines, each line connecting a rotational axis of the tire with a center of a reference line connecting both ends of a ridge in the tire radial direction; and the angles between adjacent ridges are uniformly disposed around the tire circumferential direction.

8. A pneumatic tire comprising:
a plurality of long radially extending ridges disposed at intervals in a tire circumferential direction and a tire radial direction on at least one tire side section; wherein
an inner row of the ridges overlap each other in projection view in the tire circumferential direction;
an outer row of the ridges overlap each other in projection view in the tire circumferential direction and are disposed on an outer side of the inner row of the ridges in the tire radial direction;
the inner row of the ridges and the outer row of the ridges do not overlap each other in projection view in the tire circumferential direction;
a sum of a lengthwise-directional length of one of the inner ridges and a lengthwise-directional length of one of the outer ridges is varied within a range of 40% to 90% of dimensions of the tire side section in a tire radial direction;
heights of the ridges from a surface of the tire side section are 6 mm or greater and 10 mm or less;
lateral-directional widths of the ridges are 3 mm or greater and 5 mm or less;
the lengthwise-directional lengths are defined as distances between both ends of the ridges as projected in the tire circumferential direction; and
at least one of the inner row and the outer row of the ridges satisfy that lengthwise-directional lengths of the ridges are non-uniformly disposed around the tire circumferential direction and are irregularly disposed around the tire circumferential direction; three or more of the lengthwise-directional lengths of the ridges are varied around the tire circumferential direction; and three of the lengthwise-directional lengths with a same value are not continuously arranged.

9. The pneumatic tire according to claim 8, wherein the lengthwise-directional lengths of at least one of the inner row and the outer row of the ridges are not varied in the tire circumferential direction.

10. The pneumatic tire according to claim 8, wherein the ridges are disposed on one tire side section, and a plurality of recesses is disposed on another tire side section.

11. The pneumatic tire according to claim 8, wherein the tire has a designated orientation with respect to an inside and outside of a vehicle upon being mounted thereupon, and the ridges are disposed on a tire side section facing the inside of the vehicle.

12. The pneumatic tire according to claim 8, wherein angles are defined as angles between adjacent lines, each line connecting a rotational axis of the tire with a center of a reference line connecting both ends of a ridge in the tire radial direction; and the angles between adjacent ridges are uniformly disposed around the tire circumferential direction.

13. A pneumatic tire comprising:
a plurality of long radially extending ridges disposed at intervals in a tire circumferential direction and a tire radial direction on at least one tire side section; wherein an inner row of the ridges overlap each other in projection view in the tire circumferential direction;

an outer row of the ridges overlap each other in projection view in the tire circumferential direction and are disposed on an outer side of the inner row of the ridges in the tire radial direction;

the inner row of the ridges and the outer row of the ridges do not overlap each other in projection view in the tire circumferential direction;

heights of the ridges from a surface of the tire side section are varied within a range of 6 mm or greater and 10 mm or less;

lateral-directional widths of the ridges are 3 mm or greater and 5 mm or less;

at least one of the inner row and the outer row of the ridges satisfy that the heights of the ridges are non-uniformly disposed around the tire circumferential direction and are irregularly disposed around the tire circumferential direction; three or more of the heights of the ridges are varied around the tire circumferential direction; and three of the heights with a same value are not continuously arranged; and heights of at least one of the inner row and the outer row of the ridges are not varied in the tire circumferential direction.

14. The pneumatic tire according to claim 13, wherein the ridges are disposed on one tire side section, and a plurality of recesses is disposed on another tire side section.

15. The pneumatic tire according to claim 13, wherein the tire has a designated orientation with respect to an inside and outside of a vehicle upon being mounted thereupon, and the ridges are disposed on a tire side section facing the inside of the vehicle.

16. The pneumatic tire according to claim 13, wherein angles are defined as angles between adjacent lines, each line connecting a rotational axis of the tire with a center of a reference line connecting both ends of a ridge in the tire radial direction; and the angles between adjacent ridges are uniformly disposed around the tire circumferential direction.

17. A pneumatic tire comprising:

a plurality of long radially extending ridges disposed at intervals in a tire circumferential direction and a tire radial direction on at least one tire side section; wherein an inner row of the ridges overlap each other in projection view in the tire circumferential direction;

an outer row of the ridges overlap each other in projection view in the tire circumferential direction and are disposed on an outer side of the inner row of the ridges in the tire radial direction;

the inner row of the ridges and the outer row of the ridges do not overlap each other in projection view in the tire circumferential direction;

lateral-directional widths of the ridges are varied within a range of 3 mm or greater and 5 mm or less;

heights of the ridges from a surface of the tire side section are 6 mm or greater and 10 mm or less;

at least one of the inner row and the outer row of the ridges satisfy that the widths of the ridges are non-uniformly disposed around the tire circumferential direction and are irregularly disposed around the tire circumferential direction; three or more of the widths of the ridges are varied around the tire circumferential direction; and three of the widths with a same value are not continuously arranged; and the widths of any one of the inner row and the outer row of the ridges are uniformly disposed around the tire circumferential direction and are regularly disposed around the tire circumferential direction.

18. The pneumatic tire according to claim 17, wherein the ridges are disposed on one tire side section, and a plurality of recesses is disposed on another tire side section.

19. The pneumatic tire according to claim 17, wherein the tire has a designated orientation with respect to an inside and outside of a vehicle upon being mounted thereupon, and the ridges are disposed on a tire side section facing the inside of the vehicle.

20. The pneumatic tire according to claim 17, wherein angles are defined as angles between adjacent lines, each line connecting a rotational axis of the tire with a center of a reference line connecting both ends of a ridge in the tire radial direction; and the angles between adjacent ridges are uniformly disposed around the tire circumferential direction.

* * * * *